(12) United States Patent
Sakamoto et al.

(10) Patent No.: US 11,849,329 B2
(45) Date of Patent: Dec. 19, 2023

(54) VEHICLE AUTHENTICATION APPARATUS

(71) Applicants: DENSO CORPORATION, Kariya (JP); TOYOTA JIDOSHA KABUSHIKI KAISHA, Toyota (JP)

(72) Inventors: Koji Sakamoto, Kariya (JP); Shigeki Nishiyama, Nagoya (JP); Tomoyuki Funayama, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 615 days.

(21) Appl. No.: 17/099,124

(22) Filed: Nov. 16, 2020

(65) Prior Publication Data

US 2021/0076203 A1 Mar. 11, 2021

Related U.S. Application Data

(63) Continuation of application No. PCT/JP2019/018471, filed on May 9, 2019.

(30) Foreign Application Priority Data

May 21, 2018 (JP) .................................. 2018-097178

(51) Int. Cl.
*H04W 12/63* (2021.01)
*H04W 4/40* (2018.01)
(Continued)

(52) U.S. Cl.
CPC ........... *H04W 12/63* (2021.01); *B60R 25/246* (2013.01); *B60R 25/34* (2013.01); *H04W 4/021* (2013.01);
(Continued)

(58) Field of Classification Search
CPC ....... H04W 12/63; H04W 4/021; H04W 4/40; H04W 12/06; H04W 12/069;
(Continued)

(56) References Cited

U.S. PATENT DOCUMENTS

| | | | |
|---|---|---|---|
| 7,109,843 B2 * | 9/2006 | Nagai | B60R 25/246 340/5.72 |
| 10,668,896 B2 * | 6/2020 | Arakawa | G07C 9/00571 |

(Continued)

FOREIGN PATENT DOCUMENTS

| | | |
|---|---|---|
| CN | 102587738 A | 7/2012 |
| CN | 107074199 A | 8/2017 |

(Continued)

*Primary Examiner* — Mohammed Waliullah
(74) *Attorney, Agent, or Firm* — Harness, Dickey & Pierce, P.L.C.

(57) ABSTRACT

A vehicle authentication apparatus includes first and second communication devices, first and second area determination devices, and a control execution device. The first communication device specifies a first area as a communication area. The second communication device specifies a second area as the communication area. The first area determination device determines whether the mobile devices are present at the first area based on a communication status of the first communication device with the mobile devices. The second area determination device determines whether at least one of mobile devices is present at the second area based on a communication status of the second communication device with the mobile devices. The control execution device executes predetermined vehicle control in response to determining no mobile devices being present at the first area; and determining at least one of the mobile devices being present at the second area.

8 Claims, 13 Drawing Sheets

(51) Int. Cl.
  *H04W 4/021*   (2018.01)
  *H04W 12/06*   (2021.01)
  *B60R 25/24*   (2013.01)
  *B60R 25/34*   (2013.01)

(52) U.S. Cl.
  CPC ............ *H04W 4/40* (2018.02); *H04W 12/06* (2013.01); *B60R 2325/202* (2013.01); *B60R 2325/205* (2013.01)

(58) Field of Classification Search
  CPC . B60R 25/246; B60R 25/34; B60R 2325/202; B60R 2325/205; B60R 25/24; E05B 49/00; H04Q 9/00
  See application file for complete search history.

(56) References Cited

U.S. PATENT DOCUMENTS

| | | | |
|---|---|---|---|
| 2006/0030268 A1* | 2/2006 | Teshima ................ | H04W 52/50 455/67.11 |
| 2007/0030136 A1* | 2/2007 | Teshima .................. | B60Q 3/80 340/458 |
| 2009/0066477 A1 | 3/2009 | Kaihori et al. | |
| 2010/0050713 A1 | 3/2010 | Nagao et al. | |
| 2012/0182122 A1 | 7/2012 | Nishiguchi | |
| 2017/0096124 A1* | 4/2017 | Watanabe ............. | H04W 4/027 |
| 2018/0081048 A1* | 3/2018 | Saitou ..................... | G01S 13/46 |
| 2019/0001926 A1* | 1/2019 | Arakawa ............... | B60R 25/241 |

FOREIGN PATENT DOCUMENTS

| | | | | |
|---|---|---|---|---|
| JP | 4760229 B2 | 8/2011 | | |
| JP | 5350719 B2 | 11/2013 | | |
| WO | WO-2020177962 A1 * | 9/2020 | ............. | B60R 25/01 |

* cited by examiner

FIG. 12
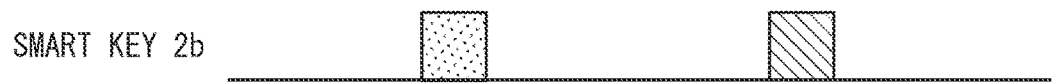
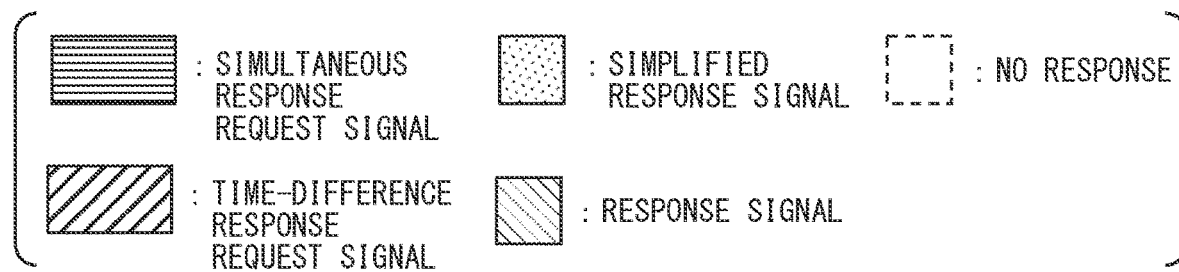

VEHICLE AUTHENTICATION APPARATUS

CROSS REFERENCE TO RELATED APPLICATIONS

The present application is a continuation application of International Patent Application No. PCT/JP2019/018471 filed on May 9, 2019, which designated the U.S. and claims the benefit of priority from Japanese Patent Application No. 2018-097178 filed on May 21, 2018. The entire disclosures of all of the above applications are incorporated herein by reference.

TECHNICAL FIELD

The present disclosure relates to a vehicle authentication apparatus that executes a predetermined vehicle control such as door locking through wireless communication with a mobile device as an electronic key.

BACKGROUND

A vehicle authentication apparatus may execute vehicle control such as door locking, door unlocking or engine activation, in response to establishing wireless connection with a mobile device carried by a user and confirming the mobile device is present at a predetermined area.

SUMMARY

The present disclosure describes a vehicle authentication apparatus having multiple mobile devices as keys of a vehicle. The apparatus includes first and second communication devices, and first and second area determination devices. The first area determination device determines whether or not none of the mobile devices are present at a first area in collaboration with the first communication device. The second area determination device determines whether or not at least one mobile device is present at a second area in collaboration with the second communication device.

BRIEF DESCRIPTION OF DRAWINGS

FIG. 12 is a diagram that illustrates the operation of each device at the execution of the process of confirming the smart key being absent inside the vehicle in a situation where multiple smart keys are present inside the vehicle cabin.

DETAILED DESCRIPTION

Figure 1:
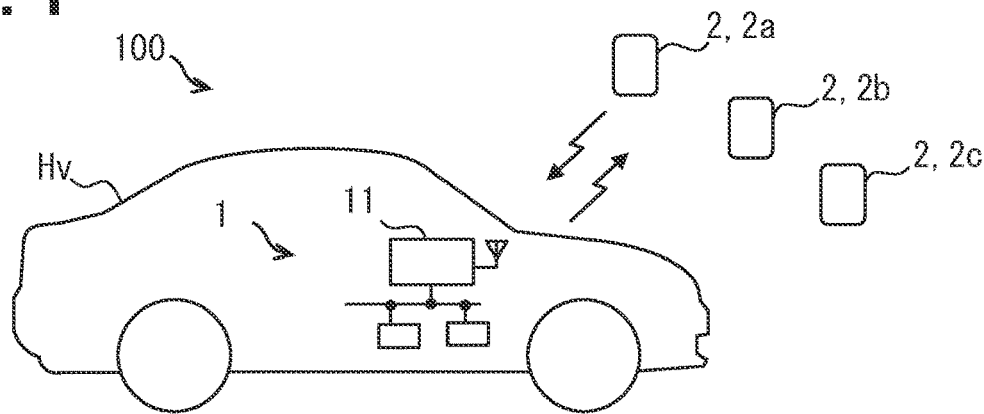
FIG. 1 is a diagram showing a schematic configuration of a vehicle electronic key system.

A mobile device adopted in a vehicle authentication apparatus may also be called as a smart key. For example, the vehicle authentication apparatus locks all doors of a vehicle in response to confirming the mobile device is present at the predetermined area outside a vehicle cabin of the vehicle (hereinafter referred to as a locking area) through wireless communication, in a situation where a locking switch disposed at the exterior surface of a vehicle body receives a locking command.

The vehicle authentication apparatus not only confirms that the mobile device is present at the locking area for confirming the mobile device not being confined inside the vehicle cabin, in a situation where the vehicle authentication apparatus executes the control of locking the doors of the vehicle. Additionally, the vehicle authentication apparatus executes the door locking control in a situation where the vehicle authentication apparatus confirms that the mobile device is absent inside the vehicle cabin through wireless communication. The wireless communication is adopted for confirming the mobile device being absent inside the vehicle cabin. The wireless communication is executed multiple times, assuming that a response signal from the mobile device cannot be received due to a communication error. In particular, the vehicle authentication apparatus transmits to the mobile device a response request signal for requesting the return of the response signal multiple times, and confirms the determination of the mobile device being absent inside the vehicle cabin in a situation where no response signals return for any of the response request signals. Therefore, a considerable amount of time is required for a series of communication processes (hereinafter referred to as an absence confirmation process) for determining the mobile device being absent inside the vehicle cabin.

In general, multiple devices (for example, two to three) are issued for one vehicle in several situations. For determining that none of the mobile devices being present inside the vehicle cabin, it is required for the vehicle authentication apparatus to execute the absence confirmation process for each of the multiple mobile devices. As a result, it takes a longer time to complete the locking of the vehicle in response to the user's locking instruction. This situation may be inconvenient for the user.

For solving the difficulties presented above, the responsiveness to the user's locking command may be enhanced by starting the absence confirmation process at a time of door closing (in other words, prior to the locking switch being pressed down).

In a method for confirming the absence of mobile devices inside a vehicle cabin by executing wireless communication with multiple mobile devices individually (hereinafter referred to as an individual confirmation method), the time required for confirming the absence of the mobile devices inside the vehicle cabin (hereinafter referred to as an absence determination required time) depends on the number of the mobile devices. In other words, the absence determination required time takes longer as the number of the mobile devices increases.

According to a configuration starting the absence confirmation process when a door is closed, it is possible to reduce the possibility of lowering the responsiveness to a user's locking instruction caused by the absence determination required time. However, even when the absence confirmation process starts at the time when the door is closed, a part of the whole part of the absence determination required time is included in a timer period from the user's locking instruction to the completion of locking, in a situation where the user gives an instruction of door locking immediately after closing the door. As the result, the responsiveness to the user's locking instruction may be lowered. In the individual confirmation method, since the absence determination required time tends to be longer as the number of the mobile devices increases, it is likely that the above-mentioned situation occurs.

A decline in the user's convenience caused by the absence determination required time is not only limited to a vehicle control related to the door locking, but may also be found at the execution of other vehicle control having an execution condition in which none of the mobile devices are present at a predetermined area.

A vehicle authentication apparatus according to an aspect of the present disclosure is adopted in a vehicle having multiple mobile devices respectively functioning as keys of the vehicle. The vehicle authentication apparatus includes a first communication device, a second communication device, a first area determination device, a second area determination device and a control execution device. The first communication device specifies a first area as a communication area, and the first area is preliminarily set for the vehicle. The second communication device specifies a second area as the communication area, and the second area is preliminarily set for the vehicle and does not overlap with the first area. The first area determination device determines whether or not the mobile devices are present at the first area based on a communication status of the first communication device with the mobile devices. The second area determination device determines whether or not the mobile devices are present at the second area based on a communication status of the second communication device with the mobile devices. The control execution device executes a predetermined vehicle control in response to that: the first area determination device determines that none of the mobile devices are present at the first area; and the second area determination device determines that at least one of the mobile devices are present at the second area. The first area determination device transmits a simultaneous response request signal requesting the mobile devices to respectively return response signals simultaneously in collaboration with the first communication device, and determines that the mobile devices are absent at the first area, in response to that the first area determination device does not receive the response signals respectively from the mobile devices corresponding to the simultaneous response request signal. The second area determination device requests the mobile devices to respectively return the response signals at different return timings which do not overlap with each other, in collaboration with the second communication device, and determines that at least one of the mobile devices is present at the second area in response to that the second area determination device receives at least one of the response signals respectively from the mobile devices.

The first area determination device in the above configuration transmits the simultaneous response request signal to detect that the mobile devices are absent in the first area, and the second determination device in the above configuration transmits the time-difference response request signal to detect that the mobile devices are present in the second area.

In the above configuration, in a situation where the mobile device is present in the first area, the vehicle cabin interior determination device may receive the response signal from the mobile device after the transmission of the simultaneous response request signal. On the other hand, in a situation where the mobile device is absent in the first area, the vehicle cabin interior determination device does not receive the response signal from the mobile device after the transmission of the simultaneous response request signal. In other words, the situation where the response signal has not been received from the mobile device in a waiting period for receiving the response signal with respect to the simultaneous response request signal suggests that the mobile device is absent at the first area.

Since the simultaneous response request signal requests multiple mobile devices to return the response signal simultaneously, the timing of returning the response signal from the mobile device which has received the simultaneous response request signal is substantially the same. Therefore, after the transmission of the simultaneous response request signal, the time required for the first area determination device to wait for the reply from the mobile device is constant regardless of the number of mobile devices. Therefore, it is possible to inhibit an increase in the absence determination required time Tp as the number of mobile devices increases.

The first area determination device does not individually execute wireless communication with multiple mobile devices. The first area determination device determines that the mobile device is absent at the first area based on the condition that the response signal has not received as the result of requesting multiple mobile devices to return the response signal simultaneously. Therefore, it is possible to inhibit the absence determination required time as compared with the configuration (hereinafter referred to as assumed configuration) for determining the absence of the mobile device at the first area by executing communication with multiple mobile devices individually. In other words, according to the above configuration, it is possible to inhibit the elongation of the absence determination required time caused by an increase in the number of mobile devices while inhibiting the absence determination required time.

Hereinafter, embodiments of the present disclosure will be described with reference to the drawings. FIG. 1 is a diagram showing an example of a schematic configuration of a vehicle electronic key system 100 of the present embodiment. As shown in FIG. 1, the vehicular electronic key system 100 includes an in-vehicle system 1 mounted on a vehicle Hv, and a smart keys 2a to 2c carried by the user of the vehicle Hv. Each of the smart keys 2a to 2c is associated with the in-vehicle system 1, and is a mobile device functioning as a key (specifically, an electronic key)

of the vehicle Hv. Each of the smart keys 2a to 2c may also be simply described as a smart key 2 in a situation of not distinguishing the smart keys 2a to 2c. The number of smart keys 2 associated with the in-vehicle system 1 is not limited to three. The number of smart keys 2 may be two or four.

The in-vehicle system 1 and multiple smart keys 2 respectively include a configuration for executing wireless communication adopting radio waves in a predetermined frequency band. In particular, the in-vehicle system 1 transmits a signal of a predetermined frequency belonging to the LF (Low Frequency) band toward a predetermined area inside the vehicle cabin and around the vehicle, and receives a signal in a UFH (Ultra High Frequency) band transmitted from the smart key 2. The smart key 2 receives a signal in the LF band transmitted from the in-vehicle system 1, and returns to the in-vehicle system 1 a signal of a predetermined frequency belonging to the UHF band. In this example, the LF band refers to a frequency band of 300 kHz or less, and includes a frequency of 20 kHz to 30 kHz or the like. The UHF band in this example refers to 300 MHz to 3 GHz.

The frequency in the LF band used in transmitting a signal from the in-vehicle system 1 to the smart key 2 in the vehicle electronic key system 100 is, for example, 125 kHz or 134 kHz. The frequency in the UHF band used in transmitting a signal from the smart key 2 to the in-vehicle system 1 is, for example, 315 MHz or 920 MHz. As one of examples described in this specification, 125 kHz is adopted as a frequency used in transmitting a signal from the in-vehicle system 1 to the smart key 2. 315 MHz is adopted as a frequency used in transmitting a signal from the smart key 2 to the in-vehicle system 1. This specification describes that the in-vehicle system 1 and the smart key 2 execute two-way wireless communication by adopting radio waves in the LF band and the UHF band. However, it is possible to modify the frequency for the in-vehicle system 1 and the smart key 2 to execute the wireless communication.

The in-vehicle system 1 authenticates the smart key 2 by mutually executing wireless communication with the smart key 2. The in-vehicle system executes predetermined vehicle control for the user to use the vehicle Hv based on the successful authentication of the smart key 2. The vehicle control for the user to use the vehicle Hv may be, for example, door locking, unlocking or engine activation.

The process for the in-vehicle system 1 to authenticate the smart key 2 is a process for confirming a communication terminal (hereinafter referred to as a communication target) being an authorized smart key 2 associated with the in-vehicle system 1. The communication terminal executes the wireless communication with the in-vehicle system 1. Successful authentication corresponds to a determination in which the communication terminal is the authorized smart key 2.

The authentication of the smart key 2 through the in-vehicle system may be executed by, for example, a challenge response method. The details of the authentication process is described in the following. In preparation for the authentication process, a common encryption key used for the authentication process is stored in each of the smart key 2 and the in-vehicle system 1. In addition, a unique identification number (hereinafter, referred to as a key ID) is assigned to the smart key 2, and the key ID is registered in the in-vehicle system 1. The key ID is distinct in each smart key 2. The encryption key used for the authentication process may also be the key ID. The in-vehicle system 1 is also assigned a unique identification number (hereinafter, referred to as a vehicle ID) and the vehicle ID is registered in the smart key 2.

As an example of the present embodiment, the vehicle Hv is an engine vehicle having only an engine as a power source. However, the vehicle Hv may also be the so-called hybrid vehicle including an engine and a motor as the power source, or may also be an electric vehicle having only the motor as the power source.

(Configuration of Smart Key 2)

Figure 2:
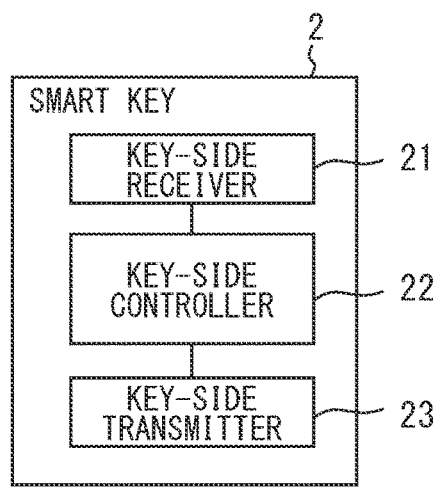
FIG. 2 is a block diagram showing an electrical configuration of a smart key.

The following describes the configuration of the smart key 2. The smart key 2 includes a key-side receiver 21, a key-side controller 22 and a key-side transmitter 23, as illustrated in FIG. 2. The key-side controller 22 is communicably connected to the key-side receiver 21 and the key-side transmitter 23.

They key-side receiver 21 receives a wireless signal (hereinafter referred to as an LF signal) at a predetermined frequency (125 kHz in this example) belonging to the LF band transmitted from the in-vehicle system 1. The key-side receiver 21 may adopt antenna for receiving the LF signal or a circuit (so-called demodulation circuit) for modulating the received signal. The key-side receiver 21 subjects the signal received by the antenna to predetermined processing such as analog-to-digital conversion, demodulation, and decoding to extract data included in the received signal. The extracted data is provided to the key-side controller 22.

The key-side controller 22 receives an input of the received signal from the key-side receiver 21, generates a baseband signal corresponding to a response signal corresponding to the received signal, and outputs the baseband signal to the key-side transmitter 23. For example, in a situation where the key-side receiver 21 receives a response request signal transmitted from the in-vehicle system 1, the key-side controller 22 generates a baseband signal as a response signal corresponding to the content of the received response request signal and outputs the baseband signal to the key-side transmitter 23. The baseband signal as the corresponding response signal is processed by a predetermined modulation process at the key-side transmitter 23 and transmitted as the wireless signal.

The key-side controller 22 generates the baseband signal including a response core generated by adopting an encryption key preliminarily registered in the smart key 2 in a situation where the response request signal including the after-mentioned challenge code transmitted from the in-vehicle system 1 is received. The baseband signal including the response code generated by the key-side controller 22 is output to the key-side transmitter 23 and transmitted as the wireless signal.

The key-side controller 22 may adopt a computer including, for example, a CPU, a RAM and a ROM. The key-side controller 22 may adopt one or more integrated circuits (IC). The key-side controller 22 may adopt an MPU or GPU.

The key-side transmitter 23 transmits to the in-vehicle system 1 the wireless signal of the predetermined frequency (315 MHz in this example) belonging to the UHF band. The key-side transmitter 23 converts a signal obtained by executing modulation or frequency conversion on the baseband signal received from the key-side controller 22 into a radio wave and then emits the radio wave into space. The key-side transmitter 23 adopts an antenna or a modulation circuit. The wireless signal transmitted by the key-side transmitter 23 may also be called an RF signal. RF is an abbreviation for Radio Frequency.

The smart key 2 may be a device carried by the user and has a function as an electronic key of the vehicle Hv. The function as the electronic key of the vehicle Hv is, specifically, a function of transmitting back a signal (for example, a response code) including information proving that it is the key of the vehicle Hv based on a request from the in-vehicle system 1. A variety of shapes such as a flat rectangular parallelepiped type, a flat elliptical body type (so-called fob type), and a card type may be adopted as the shape of the smart key 2. The smart key 2 may be configured as a wearable device worn on a finger, arm, or the like of a user. Furthermore, the smart key 2 may be an information processing terminal such as a smartphone or a tablet terminal.

(Configuration of In-Vehicle System 1)

Figure 3:
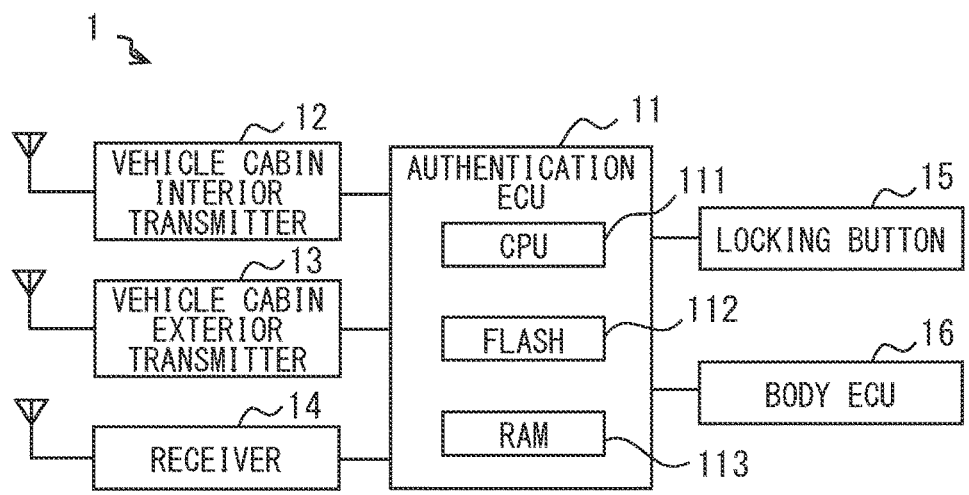
FIG. 3 is a block diagram showing an electrical configuration of an in-vehicle system.

The following describes the configuration of the in-vehicle system 1. The in-vehicle system 1 includes an authentication ECU 11, a vehicle cabin interior transmitter 12, a vehicle cabin exterior transmitter 13, a receiver 14, a locking button 15 and a body ECU 16, as illustrated in FIG. 3. The ECUs in the member names are abbreviations of Electronic Control Unit and refers to electronic control units. The in-vehicle system 1 corresponds to a vehicle authentication apparatus.

The authentication ECU 11 is an ECU executing the control process related to the locking of the door of the vehicle Hv such as the door locking process described in the following. The authentication ECU 11 is connected to each of the authentication ECU 11, the vehicle cabin interior transmitter 12, the vehicle cabin exterior transmitter 13, the receiver 14, the locking button 15 and the body ECU 16 by a dedicated signal line. The body ECU 16 may be mutually communicated with the authentication ECU 11 through communication network build in the vehicle. The same applies to, for example, the vehicle cabin interior transmitter 12, the vehicle cabin exterior transmitter 13, the receiver 14, the locking button 15. The receiver 14 may be built in the authentication ECU 11.

The authentication ECU 11 is configured as a computer including a CPU 111, a flash memory 112, a RAM 113, an I/O, and a bus line connecting these components. The authentication ECU 11 may be implemented using a GPU or MPU instead of the CPU 111. Further, the authentication ECU 11 may be implemented by a combination of a CPU 111, a GPU, and an MPU.

The flash memory 112 is a non-volatile and rewritable memory. The flash memory 112 stores a program (hereinafter, authentication apparatus program) for causing the computer to function as the authentication ECU 11, and the like. Various non-transitory tangible storage media (non-transitory tangible storage medium) can be adopted as a particular storage medium of the authentication apparatus program. The execution of the authentication apparatus program through the CPU 111 corresponds to the execution of the method corresponding to the authentication apparatus program. The details of the functions provided by the authentication ECU 11, which are expressed when the CPU 111 executes the authentication apparatus program, is described hereinafter.

The vehicle cabin interior transmitter 12 converts a carrier wave signal received from the authentication ECU 11 into a radio wave of the predetermined frequency (125 kHz in this example) belonging to the LF band, and then transmits the radio wave to the space. For simplicity, the configuration in which the carrier signal received from the authentication ECU 11 is converted into the radio wave of the predetermined frequency belong to the LF band and is emitted to the space is also described as an LF transmitter. The vehicle cabin interior transmitter 12 is the LF transmitter disposed inside the vehicle cabin so that the entire vehicle cabin interior area is the response area. The vehicle cabin interior corresponds to a first area.

The response area corresponds to a range in which the smart key 2 returns a response signal to the LF band signal (hereinafter referred to as the LF signal) transmitted from the LF transmitter. For example, the response area may be a range in which the LF signal transmitted by the in-vehicle system 1 propagates while maintaining a predetermined signal strength (hereinafter referred to as a response threshold value). The response threshold value corresponds to a signal strength of the LF signal defining the magnitude of the response area. The response threshold value may be, for example, a lower limit value (that is, a demodulation limit value) of a signal level that may be demodulated by the smart key 2. The response threshold value may be a predetermined value larger than the demodulation limit value. The response threshold value is an element to be properly designed by a designer to form the desired response area. Even when the smart key 2 receives a signal from the in-vehicle system 1, the smart key 2 determines that the signal is outside the response area and does not return the response, in a situation where the signal strength is smaller than or equal to the response threshold value. The response area corresponds to a communication area.

Figure 4:
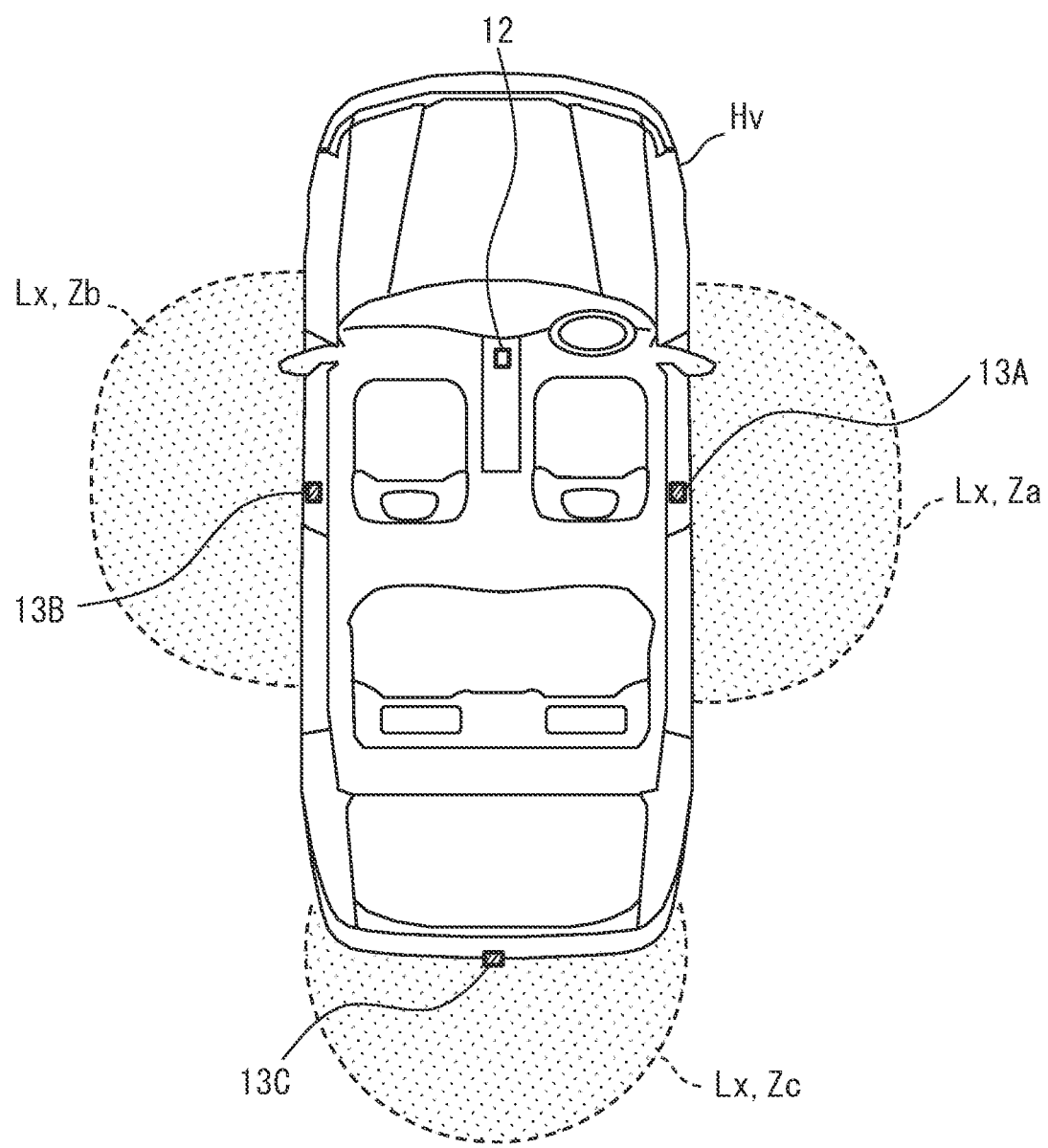
FIG. 4 is a diagram conceptually showing a response area provided by each vehicle exterior transmitter.

The vehicle cabin interior transmitter 12 may be provided at a central portion in a vehicle width direction of an instrument panel or in the vicinity of a center console box. Although only one vehicle cabin interior transmitter 12 is illustrated in FIGS. 3 and 4, multiple vehicle cabin interior transmitter 12 may be provided in the vehicle cabin interior. FIG. 4 omits the illustration of the response area of the vehicle cabin interior transmitter 12.

The vehicle cabin exterior transmitter 13 is the LF transmitter for setting a predetermined area outside the vehicle cabin as a response area. The vehicle cabin exterior transmitter 13 converts the carrier wave signal received from the authentication ECU 11 into the radio wave of the predetermined frequency belonging to the LF band. The in-vehicle system 1 includes multiple vehicle cabin exterior transmitters 13. As an example of the present embodiment, a first vehicle cabin exterior transmitter 13A, a second vehicle cabin exterior transmitter 13B and a third vehicle cabin exterior transmitter 13C are provided as the vehicle cabin exterior transmitter 13 in the vehicle Hv, as illustrated in FIG. 4.

The first vehicle cabin exterior transmitter 13A is the LF transmitter disposed at the outer door handle for a driver's seat. The outer door handle indicates a gripping member provided on the outer surface of the door for opening and closing the door. The first vehicle cabin exterior transmitter 13A is designed so that the response area is within 1 meter from the outer door handle for the driver's seat. Za in the drawing conceptually illustrates the response area provided by the first vehicle cabin exterior transmitter 13A. The second vehicle cabin exterior transmitter 13B is the LF transmitter disposed at the outer door handle for a driver assistant's seat. The second vehicle cabin exterior transmitter 13B is designed so that the area outside the vehicle cabin within 1 meter from the outer door handle for the driver assistant's seat is the response area. Zb in the drawing conceptually illustrates the response area provided by the second vehicle cabin exterior transmitter 13B.

The third vehicle cabin exterior transmitter 13C is the LF transmitter disposed at the door handle of a trunk door. The third vehicle cabin exterior transmitter 13C is designed so that the response area is within a predetermined distance (for example, 0.75 meters) from the trunk door outside the vehicle cabin.

Zc in the drawing conceptually illustrates the response area provided by the third vehicle cabin exterior transmitter 13C. A variety of the vehicle cabin exterior transmitters 13 may be built in the door handle, or may be disposed at a panel portion near the door handle. Each mode corresponds to the configuration disposed at the door handle. The vehicle cabin exterior transmitter 13 may also be disposed at a part other than the door handle such as a B-pillar. The response areas Za to Zc respectively provided by the vehicle cabin exterior transmitters 13 are provided outside the vehicle cabin, and do not overlap with the vehicle cabin interior. The response areas Za to Zc respectively provided by the vehicle cabin exterior transmitters 13 correspond to a locking area Lx and a second area.

The magnitude or shape of the response area provided by an individual LF transmitter may be properly designed. The magnitude of the response area formed by each LF transmitter may be adjusted according to, for example, the response threshold value, transmission power of the LF signal, or the reception sensitivity at the smart key 2. Each vehicle cabin exterior transmitter 13 may provide a response area within 5 meters from the vehicle Hv. The number or arrangement of the LF transmitters included in the in-vehicle system 1 may be properly modified. The in-vehicle system 1 may include the LF signal providing a response area inside the trunk.

A variety of the LF transmitters as the vehicle cabin interior transmitter 12 and the vehicle cabin exterior transmitter 13 may adopt an antenna for transmitting a predetermined frequency belonging to the LF band. The operating frequency of the LF transmitter may be appropriately designed, and may be set to 134 kHz or 30 kHz or less (for example, 28 kHz).

The receiver 14 is a communication module for receiving a signal from the smart key 2. In particular, the receiver 14 according to the present embodiment receives a radio wave of the predetermined frequency (315 MHz in this example) belong to the UHF band. The receiver 14 may adopt, for example, antenna for receiving a wireless signal in the UHF band transmitted from the smart key 2, or a modulation circuit. The frequency for the reception target of the receiver 14 may be set to a frequency which is preset as the frequency used for wireless communication with the smart key 2. The frequency used for the wireless communication with the smart key 2 may be 920 MHz, 2.4 GHz, or the like. The receiver 21 subjects the signal received by the UHF antenna to predetermined processing such as analog-to-digital conversion, demodulation, and decoding to extract data included in the received signal. The extracted data is provided to the authentication ECU 11. The receiver 14 may be built in the authentication ECU 11.

The locking button 15 is a button for the user to give an instruction to the in-vehicle system 1 to lock the door of the vehicle Hv. When the user presses down the locking button 15, the locking button 15 outputs a control signal indicative of this fact to the authentication ECU 11. The locking button 15 is disposed at a predetermined position of the outer surface of the door of the vehicle Hv. Although FIG. 3 illustrates only one locking button 15, the in-vehicle system 1 may have multiple locking buttons. As an example described in this specification, the locking button 15 is disposed around the outer door handle for the driver seat of the vehicle Hv, the outer door handle for the driver assistant seat of the vehicle Hv, and the door handle of the trunk door.

A touch sensor may be employed as a configuration for receiving the instruction for locking the door from the user. The touch sensor is a device that detects that the user is touching the door handle. The touch sensor for receiving the door locking instruction from the user may also be provided at the outer door handle at the door of the driver seat or the door of the driver assistant seat. The configuration for receiving the door locking instruction from the user may have a combination of the locking button 15 and the touch sensor. The locking button 15 or the touch sensor disposed at the door handle may be an input device for the user to give an instruction of opening the door of the vehicle Hv.

The body ECU 16 is an ECU that controls various actuators mounted on the vehicle. For example, the body ECU 16 outputs a predetermined control signal to a door lock motor provided on each of the doors based on a request from the authentication ECU 11 to lock each of the doors. The door lock motor is a motor for controlling the state of the lock mechanism as the mechanism for locking the door. The door lock motor and the lock mechanism are disposed at each door. In addition, the body ECU 16 acquires information indicating an open and close state of each of the doors provided in the vehicle, information indicating a locked state of each of the doors, and the like. The opening and closing states of the doors may be detected by a courtesy switches. The function of the body ECU 16 may be provided by the authentication ECU 11. In other words, the body ECU 16 may be integrated with the authentication ECU 11.

(Function of Authentication ECU 11)

Figure 5:
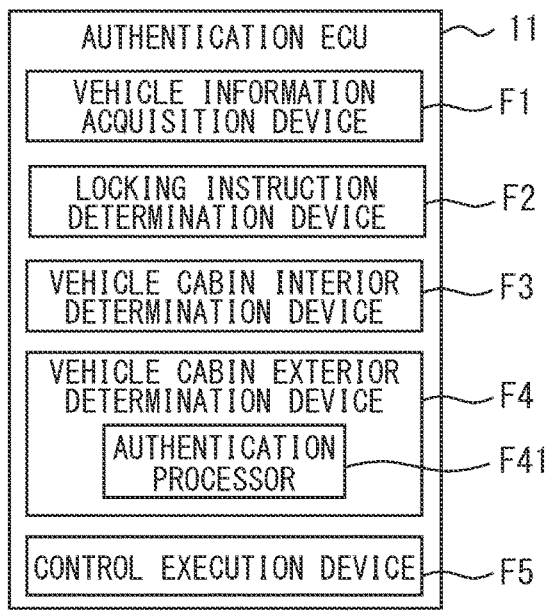
FIG. 5 is a functional block diagram of an authentication ECU.

The authentication ECU 11, as illustrated in FIG. 5, includes a vehicle information acquisition device F1, a locking instruction determination device F2, a vehicle cabin interior determination device F3, a vehicle cabin exterior determination device F4, and a control execution device F5, as functional blocks for the CPU to execute the above-mentioned authentication apparatus program. Some or all of the functions of the authentication ECU 11 may be configured as hardware. A configuration in which a certain function is realized as hardware includes a configuration in which the function is realized by use of one or more ICs or the like.

The vehicle information acquisition device F1 acquires various information (in other words, vehicle information) of the vehicle Hv from a sensor or ECUs mounted on the vehicle. The vehicle information includes, for example, an open/closed state of the door, a locked state of each door, whether or not the locking button 15 is pressed. The opening and closing states of the doors, the locking state of the doors, and the like can be acquired from the body ECU 16, for example. Whether or not the locking button 15 is pressed can be determined from the signal output from the locking button 15.

The acquisition of the information indicating the locked state of each door corresponds to the determination of the locked state of each door. The acquisition of the information indicating the locked/unlocked state of each door corresponds to the determination of the locked/unlocked state of each door and the detection of the opening operation/closing operation of the door by the user. The acquisition of an electrical signal from the locking button corresponds to the detection of the user operation on the locking button. The vehicle information acquisition device F1 corresponds to a configuration for detecting the user operation on the vehicle Hv such as opening or closing the door or pressing the locking button 15. The vehicle information described hereinafter includes the user operation on the vehicle Hv.

The type of information included in the vehicle information is not limited to the information described above. The vehicle information also includes, for example, a shift position detected by a shift position sensor (not shown), a detection result of a brake sensor for detecting whether or not a brake pedal is pressed, and the state of a vehicle power source. The operation state of the parking brake can also be included in the vehicle information.

In addition, the vehicle information acquisition device F1 specifies a present state of the vehicle Hv based on the various information described above. For example, when the vehicle information acquisition device F1 determines that a travel power supply (for example, an ignition power supply) is off and all the doors are locked, the vehicle information acquisition device F1 determines that the vehicle Hv is parking. It is needless to say that the condition for determining that the vehicle Hv is parked may be designed as appropriate, and various determination conditions can be applied. The vehicle information acquisition device F1 detects that all doors are closed based on the information indicating each door's opening/closing state. Therefore, the vehicle information acquisition device F1 corresponds to a door closing detector.

The locking instruction determination device F2 determines whether or not the user gives an instruction of locking the door. The locking instruction determination device F2 according to the present embodiment determines whether the user gives an instruction of locking the door of the vehicle, based on an output signal of the locking button 15. In particular, the locking instruction determination device F2 determines that the user gives an instruction of locking the door of the vehicle Hv, in a situation where the locking button 15 outputs a signal indicating the button pressed by the user in a state where the door of the vehicle is not locked.

The locking instruction determination device F2 may receive the door locking instruction through a voice command. For example, the locking instruction determination device F2 may receive an instruction of the execution of the door locking through execution of a voice recognition process on a user's voice signal acquired from a microphone where for collecting the sound outside of the vehicle cabin. The microphone for acquiring the voice command corresponding to the execution of instructing the door locking may be provided at the outer surface of the vehicle Hv such as the outer portion of the B-pillar of the vehicle Hv.

The locking instruction determination device F2 may receive an instruction for executing door locking, based on an output signal of an infrared sensor providing a detection area under the door. In particular, the locking instruction determination device F2 may determine that the user gives an instruction of the door locking, in a situation where the locking instruction determination device F2 receives from the infrared sensor a signal that indicates the user has held his or her foot over the detection area. According to such a configuration, the user may give an instruction of the door locking by holding his or her foot under the door. The locking button 15, the microphone disposed at the outer surface of the vehicle Hv, the infrared sensor providing a detection area under the door or the like corresponds to an input device for the user to give an instruction of the door locking.

The vehicle cabin interior determination device F3 determines whether or not the smart key 2 is present inside the vehicle cabin, based on the communication status with the smart key 2 adopting the vehicle cabin interior transmitter 12. The vehicle cabin interior determination device F3 generally transmits a response request signal toward the vehicle interior in collaboration with the vehicle cabin interior transmitter 12, and determines whether or not the smart key 2 is present inside the vehicle cabin based on whether the vehicle cabin interior determination device F3 receives a response signal corresponding to the response request signal. The response request signal is the LF signal for requesting the smart key 2 to return the response signal.

The vehicle cabin exterior determination device F4 determines whether or not the smart key 2 is present in the locking area Lx. based on the communication status with the smart key 2 by adopting the vehicle cabin exterior transmitter 13.

The vehicle cabin exterior determination device F4 generally transmits the response request signal toward the vehicle cabin exterior in collaboration with each vehicle cabin exterior transmitter 13, and determines whether or not the smart key 2 is present at the locking area Lx based on whether or not the vehicle cabin exterior determination device F4 receives a response request signal corresponding to the response request signal. In other words, the locking area Lx is the response area provided by the vehicle cabin exterior transmitter 13.

The details of the vehicle cabin interior determination device F3 and the vehicle cabin exterior determination device F4 are described hereinafter. The vehicle cabin interior determination device F3 corresponds to a first area determination device. The vehicle cabin exterior determination device F4 corresponds to a second area determination device. Whether or not the response signal is received corresponds to the reception status. The configuration including the vehicle cabin interior transmitter 12 and the receiver 14 corresponds to the vehicle cabin interior communication device and a first communication device. The configuration including the vehicle cabin exterior transmitter 13 and the receiver 14 corresponds to the vehicle cabin exterior communication device and the second communication device.

The vehicle cabin exterior communication device F4 includes an authentication processor F41 as a finer functional block. The authentication processor F41 executes the authentication process through wireless communication with the smart key 2 by adopting a challenge code. The challenge code is a code for authenticating the smart key 2. The challenge code may be a random number generated with the use of a random number table or the like. For example, the authentication processor F41 generates the challenge code in response to receiving the after-mentioned simplified response signal.

The vehicle cabin exterior determination device F4 transmits the response request signal including the challenge code generated by the authentication processor F41 at a predetermined timing such as, for example, a situation of receiving the simplified response signal. As described above, the smart key 2 returns an RF signal (the so-called response signal) including the response code with the encryption of the challenge code through the encryption key preliminarily registered in the smart key, in response to receiving the signal having the challenge code.

The authentication processor F41 generates a verification code for each smart key 2 by adopting the encryption key for each smart key, in response to generating the challenge code. The verification code is a code acquired by encrypting the challenge code by adopting the encryption key of the smart key 2. The authentication processor F41 determines that the communication target is the authorized smart key 2 (in other words, successful authentication), in response to the response code returned from the smart key 2 matching the verification code. The vehicle cabin interior determination device F3 may include a function corresponding to the above-mentioned authentication processor F41.

The control execution device F5 executes the vehicle control such as door locking or unlocking in collaboration with the body ECU 16. For example, the control execution device F5 requests the body ECU 16 to lock the door of the vehicle Hv, in a condition that: the vehicle cabin interior determination device F3 determines that none of the smart keys is present inside the vehicle cabin; and the vehicle cabin exterior determination device F4 determines that at least one of the smart key 2 is present at the locking area Lx. As described above, the body ECU 16 locks each door by driving the door lock motor based on the request from the authentication ECU 11.

(Door Locking Process)

Figure 6:
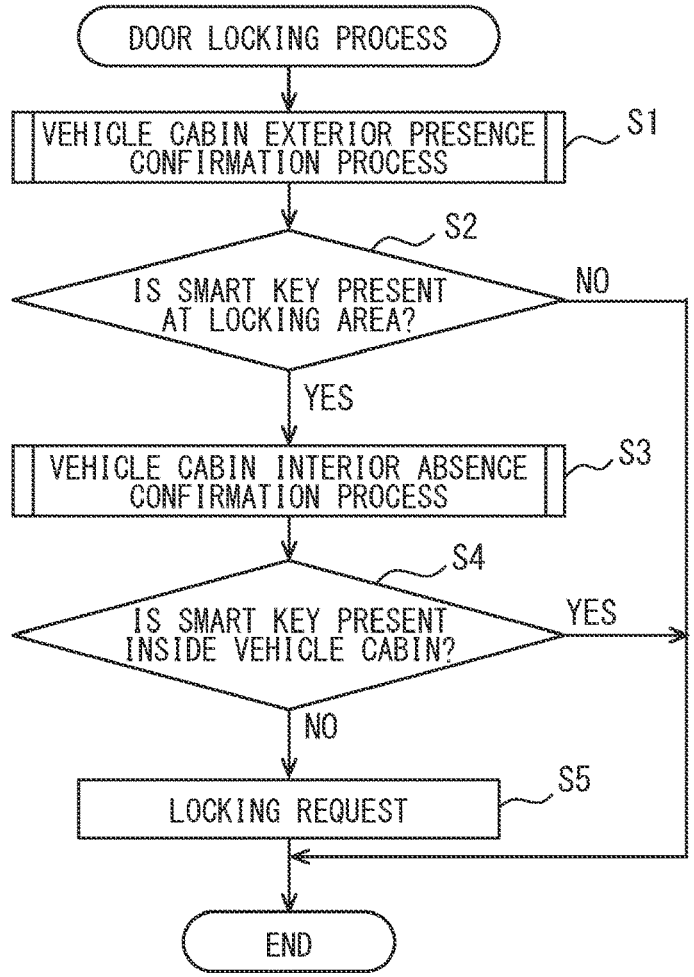
FIG. 6 is a flowchart related to a door locking process executed by the authentication ECU.

The following describes the door locking process executed by the authentication ECU 11 with reference to the flowchart in FIG. 6. The flowchart illustrated in FIG. 6 may start in a situation where the locking instruction determination device F2 determines that the user gives an instruction of locking the door. In particular, the flowchart may start in response to pressing the locking button 15, in a situation where the door of the vehicle Hv has not been locked. The door locking process includes S1 to S5.

In S1, the vehicle cabin exterior determination device F4 executes a vehicle cabin exterior presence confirmation process in collaboration with each vehicle cabin exterior transmitter 13 and the receiver 14. The vehicle cabin exterior presence confirmation process is a process that determines whether or not the smart key is present at the locking area Lx. The vehicle cabin exterior presence confirmation process is described with reference to FIG. 7 in detail hereinafter.

In a situation where it is determined that at least one of the smart keys 2 registered in the vehicle Hv is present in the locking area Lx as a result of the vehicle cabin exterior presence confirmation process in S1, affirmative determination is made in S2 and then S3 is executed. On the other hand, in a situation where none of the smart keys 2 is present in the locking area Lx as a result of the vehicle cabin exterior presence confirmation process in S1, negative determination is made in S2 and then the present flow ends. In a situation where the process is terminated due to the reason that none of the smart keys 2 is found within the locking area Lx, the in-vehicle display may display a message and notify the user of the smart keys 2 not found. The notification to the user may be configured by outputting an alarm sound having a predetermined pattern or turning on a light (for example, a headlight or a hazard lamp) mounted on the vehicle.

In S3, the vehicle cabin interior determination device F3 executes a vehicle cabin interior absence process in collaboration with the vehicle cabin interior transmitter 12 and the receiver 14. The vehicle cabin interior absence confirmation process is a process that determines whether or not the smart key 2 is present inside the vehicle cabin. The vehicle cabin interior absence confirmation process is hereinafter described with reference to FIG. 9 in detail. In a situation where it is determined that none of the smart keys 2 is present inside the vehicle cabin as a result of the vehicle cabin interior absence confirmation process in S3, negative determination is made in S4 and then S5 is executed. On the other hand, in a situation where it is determined that smart key 2 is present inside the vehicle cabin as the result of the vehicle cabin interior absence confirmation process in S3, affirmative determination is made in S4 and then the present flow ends. In a situation where the process is terminated due to a reason that the smart key 2 remains inside the vehicle cabin, the in-vehicle display may, for example, display a message to notify the user of the smart key 2 remaining inside the vehicle cabin. The notification of the smart key 2 remaining in the vehicle cabin to the user may be configured by outputting an alarm sound having a predetermined pattern or turning on a light (for example, a headlight or a hazard lamp) mounted on the vehicle.

In S5, the control execution device F5 requests the body ECU 11 to lock the door of the vehicle Hv. The body ECU 16 drives the door lock motor based on the request from the authentication ECU 11 and sets the lock mechanism of each door to the locked state. When the process in S5 is completed, the present flow ends.

(Vehicle Cabin Exterior Presence Confirmation Process)

Figure 7:
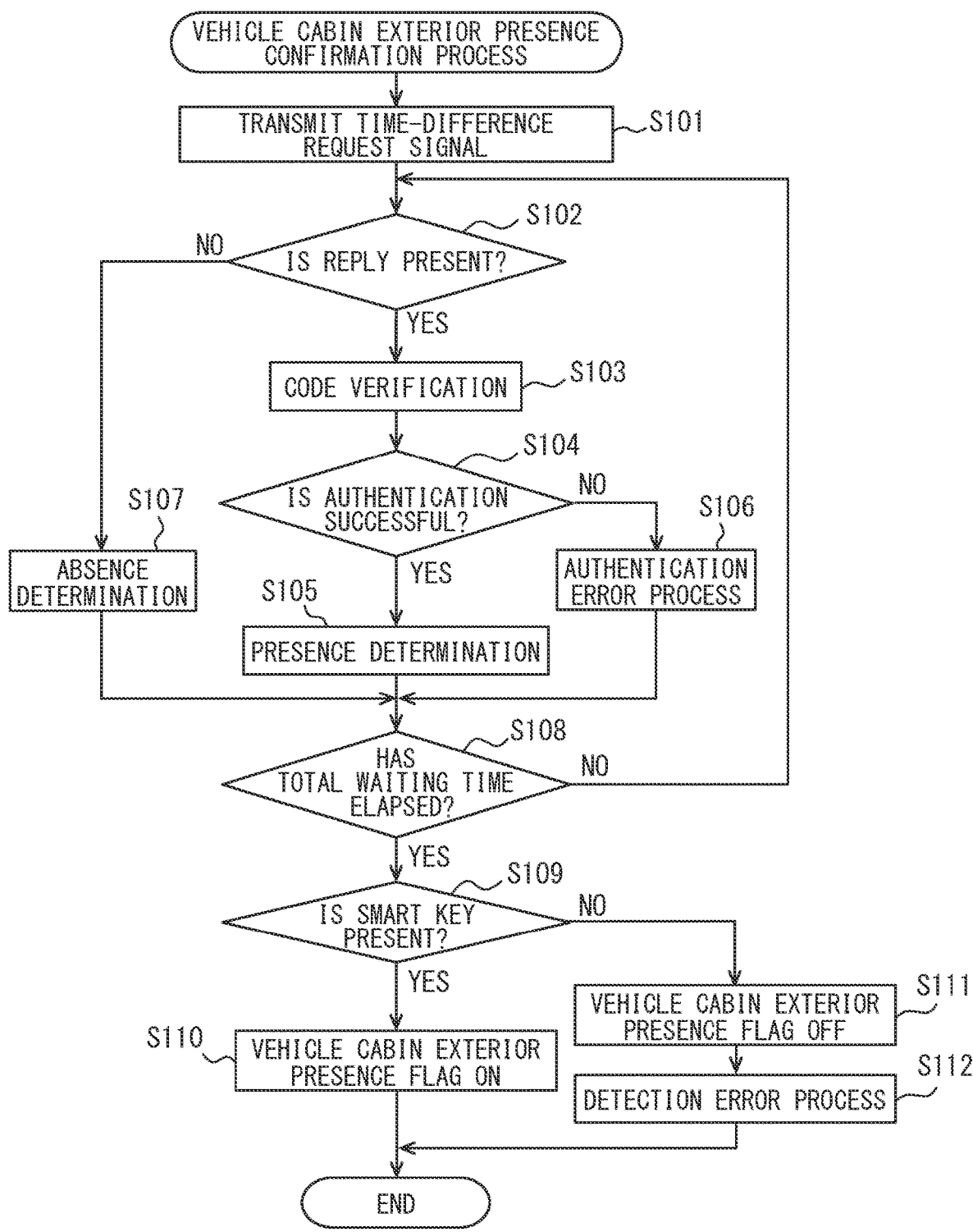
FIG. 7 is a flowchart related to a process of confirming the smart key being present outside the vehicle cabin.

The following describes the vehicle cabin exterior presence confirmation executed by the vehicle cabin exterior determination device F4 with reference to the flowchart in FIG. 7. The vehicle cabin exterior presence confirmation process is executed, for example, as S1 of the door locking process. The vehicle cabin presence confirmation process according to the present embodiment includes S101 to S112 as an example. Each step is executed in collaboration with the vehicle cabin exterior transmitter 13 or the receiver 14 as appropriate.

In S101, a time-difference response request signal is transmitted from each vehicle cabin exterior transmitter 13. The time-difference response request signal is the LF signal that requests each smart key 2 to return the response signal at a timing which does not overlap with other timings. The time-difference response request signal corresponds to an example of the response request signal. The timing at which each smart key 2 returns the response signal corresponding to the time-difference response request signal may be registered in the smart key 2 in advance.

Figure 8:
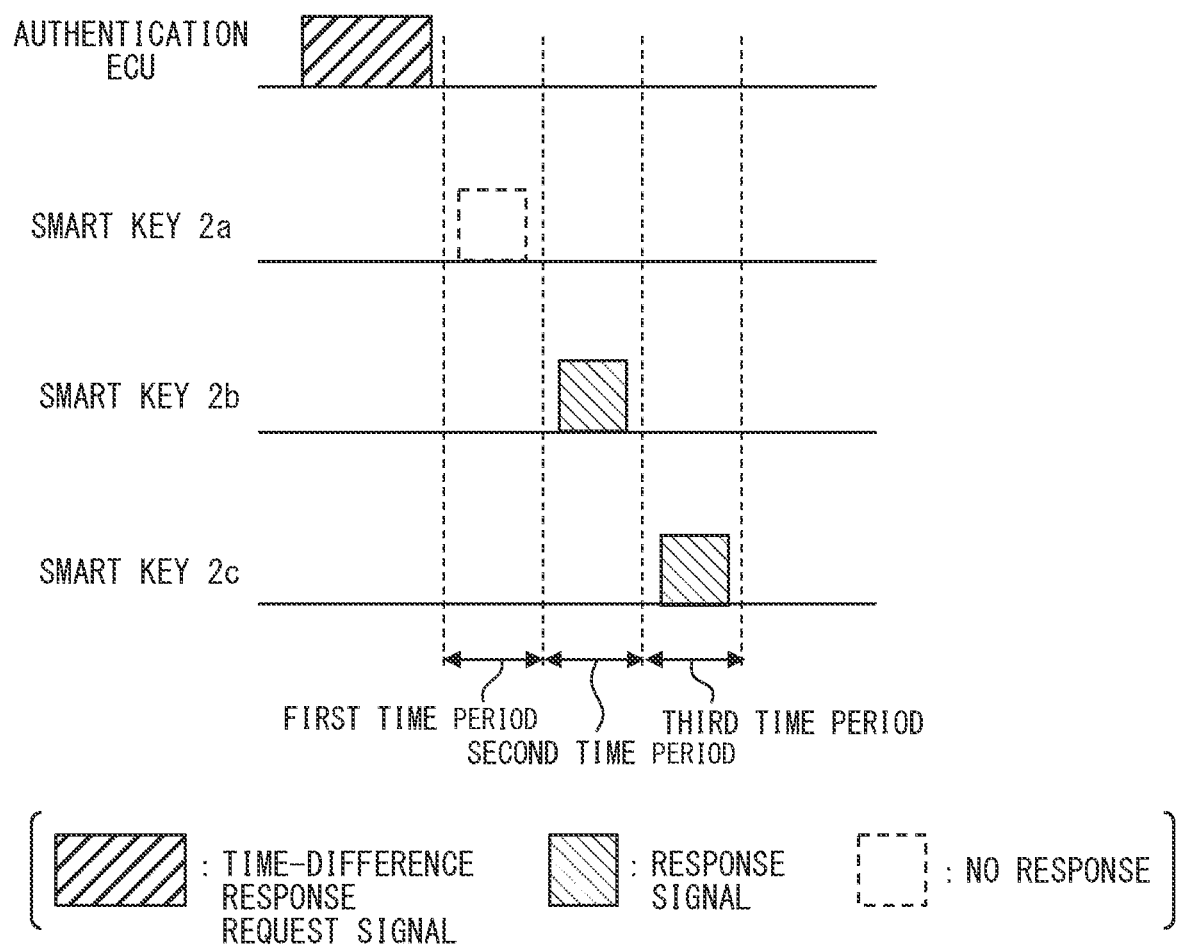
FIG. 8 is a diagram that illustrates the operation of each device at the execution of the process of confirming the smart key in a situation where the smart key is present in a locking area.

For example, the smart key 2 is configured such that the smart keys 2a, 2b and 2c respectively return the response signals in order with time difference as illustrated in FIG. 8. In particular, the smart key 2a returns the response signal in the first time period defined as a time point where the time-difference response request signal is received as the starting time. The smart key 2b returns the response signal in the second time period as a time period subsequent to the first time period. The smart key 2c returns the response signal in the third time period as a time period subsequent to the second time period.

Each time period corresponds to a period during which the smart key 2 transmits the response signal, in other words, a period during which the authentication ECU 111 waits for the return of the response signal from the smart key 2. Each time period is set to a length required for the smart key 2 to complete the return of the response signal. FIG. 8 conceptually illustrates the behavior of each device in a situation where the smart keys 2b and 2c are present at the locking area Lx, at a time of executing the vehicle cabin exterior presence confirmation process.

Although this specification describes that the timing for requesting each smart key 2 to return the response signal with respect to the time-difference request signal is registered in advance, the execution method for each smart key 2 to respond one response request signal with time difference is not limited to this situation. For example, the time-difference response request signal may include data that specifies the timing for each smart key 2 to return the response signal. The data is referred to as return timing specified data. In a situation where the time-difference response request signal includes the return timing specified data, each smart key 2 may return the response signal at the timing specified by the return timing specified data. The return timing specified data specifies delay time from the reception of the time-difference response request signal by each smart key 2 to the return of the response signal. The timing is set distinctly for each smart key 2. Additionally, each smart key 2 may arbitrate the transmission timing of the response signal by the CSMA/CA (Carrier Sense Multiple Access/Collision Avoidance).

The time-difference response request signal transmitted in S101 is the response request signal for all smart keys 2. In S101, the time-difference response request signal includes a challenge code as an example, and is configured as the LF signal for requesting the return of the response code. Therefore, each smart key 2 that has received the time-difference response request signal returns a signal as the response signal including the response code corresponding to the challenge code included in the time-difference response request signal.

As another aspect, the time-difference response request signal transmitted in S101 may request the return of the response signal (hereinafter referred to as a simplified response signal) that indicates a constant bit string registered in the smart key 2 in advance. The simplified response signal corresponds to a signal not having the response code. The simplified response signal may include source information so that the authentication ECU 11 may identify which smart key has responded. The source information may be the key ID, or may also be a key number that indicates the number of the smart key. In a situation where the time-difference response request signal requests the return of the simplified response signal, the authentication ECU 11 may separately transmit the response request signal including the challenge code to the smart key 2 which has returned the simplified response signal, when the authentication ECU 11 receives the response signal from the smart key 2. When the transmission of the time-difference response request signal is completed, the process proceeds to S102. When the transmission of the time-difference response request signal is completed, the authentication ECU 11 starts measuring the elapsed time from the time at which the transmission is completed. The authentication processor F41 calculates the verification code for each smart key 2 corresponding to the challenge code included in the time-difference response request signal transmitted in S101.

In S102, it is determined whether or not the response signal from one (the smart key 2a in this example) of the multiple smart keys 2, which should return the response signal in the first time period, is received. In a situation where the response signal from the smart key 2a is received in the first time period, affirmative determination is made in S102 and then S103 is executed. On the other hand, in a situation where the response signal from the smart key 2a cannot be received in the first time period, negative determination is made in S102 and then S107 is executed.

In S103, the authentication processor F41 executes the verification of the response code included in the received response signal. In a situation where the received response code matches the verification code as a result of the verification process in S103 (in other words, YES in S104), S105 is executed. On the other hand, in a situation where the received response code does not match the verification code as the result of the verification process in S103 (in other words, NO in S104), the process proceeds to S106.

In S105, it is determined that the smart key 2a is present at the locking area Lx, and the process proceeds to S108. In S106, a predetermined authentication error process is executed, and then the process proceeds to S108. The authentication error process is a process to be executed when the authentication of the smart key 2 fails, and the particular content of the authentication error process may be appropriately designed. For example, the authentication error process may retransmit the challenge code and retry the authentication of the smart key 2a. In the authentication error process, the smart key 2a may be considered to be absent. In S107, it is determined that the smart key 2a is absent at the locking area Lx, and then the process proceeds to S108.

In S108, it is determined whether or not a total waiting time has elapsed after transmission of the time-difference response request signal. The total waiting time is set to a value obtained by adding a predetermined margin to the sum value of the time from the first period to the third period. In a situation where the total waiting time has not elapsed after the transmission of the time-difference response request signal, negative determination is made in S108 and then the process returns to S102, and the reply of the response signal from the other smart key 2 is awaited.

For example, when the first time period ends, negative determination is made in S108 and then the process returns to S102, and subsequently the reply of the response signal from the smart key 2b is awaited. In other words, it is determined whether or not the smart key 2b is present at the locking area Lx. When the second time period ends, negative determination is made in S108 and the process returns to S102, and the reply of the response signal from the smart key 2c is awaited. In other words, it is determined whether or not the smart key 2c is present at the locking area Lx. The sequential process from S102 to S108 corresponds to a process for waiting the reply from each smart key 2. In a situation where the total waiting time has elapsed from the transmission of the time-difference response request signal in S108, the process proceeds to S109.

In S109, the sequential process from S101 to S108 determines whether or not at least one of the multiple smart keys 2 is present at the locking area Lx. In a situation where it is determined that at least one of the smart keys 2 is present at the locking area Lx, affirmative determination is made in S109 and then the process proceeds to S110. On the other hand, in a situation whether none of the smart keys 2 is detected, negative determination is made in S109 and then the process proceeds to S111.

In S110, a vehicle cabin exterior presence flag is set to an ON state, and the present flow ends. In S111, the vehicle cabin exterior presence flag is set to an OFF state and then S112 is executed. The vehicle cabin exterior presence flag is a flag in the process that indicates whether or not the smart key is present in the locking area Lx. The situation where the vehicle cabin exterior presence flag is at the ON state indicates that the smart key 2 is present at the locking area Lx. The situation where the vehicle cabin exterior presence flag is at the OFF state indicates that the smart key 2 is absent at the locking area Lx. The vehicle cabin exterior presence flag is set to the OFF state. S2 in the door locking process in FIG. 6 may be determined based on the setting state of the vehicle cabin exterior presence flag.

In S112, the detection error handling process is executed and then the present flow ends. The detection error process may be a process to be executed in a situation whether it cannot be confirmed that the smart key 2 is present at the locking area Lx, and the particular content of the detection error process may be appropriately designed. For example, the detection error process may be a process for re-execute the sequential process from S101. In the detection error process, the user may be informed by, for example, the output of the alarm sound, the message display on the in-vehicle display, or turning on or off the in-vehicle light.

(Vehicle Cabin Interior Absence Confirmation Process)

Figure 9:
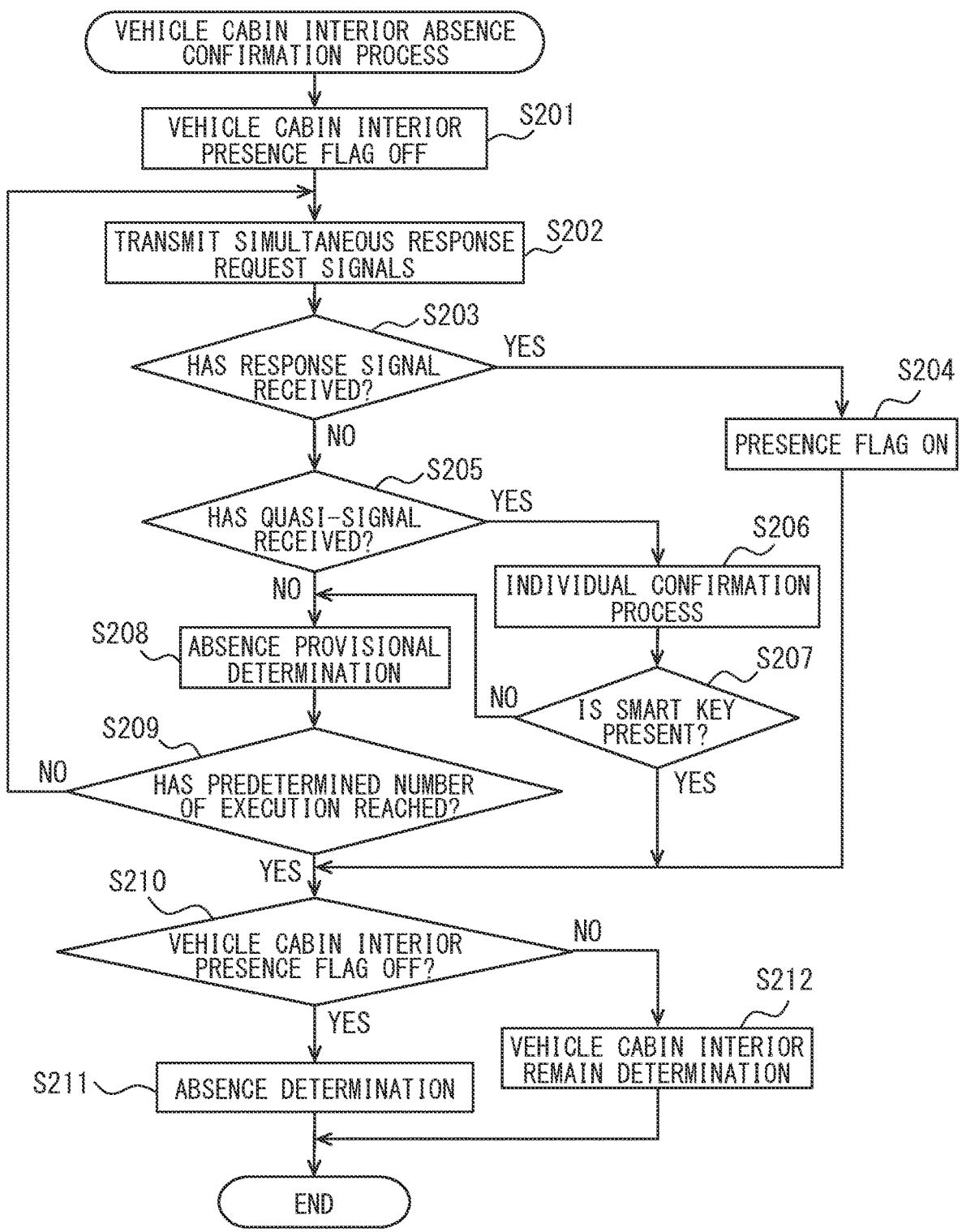
FIG. 9 is a flowchart related to a process of confirming the smart key being absent inside the vehicle cabin.

The following describes the vehicle cabin exterior presence confirmation executed by the vehicle cabin exterior determination device F4 with reference to the flowchart in FIG. 9. The vehicle cabin interior absence confirmation is executed as, for example, S3 of the above-mentioned door locking process. In the present embodiment, for example, the vehicle cabin interior absence confirmation process includes S201 to S212.

In S201, the vehicle cabin interior presence flag is set to the OFF state and then the process proceeds to S202. The vehicle cabin interior presence flag is a flag in the process that indicates whether or not the smart key 2 is present inside the vehicle cabin. The situation where the vehicle cabin interior presence flag is set to the ON state indicates that the smart key 2 is present inside the vehicle cabin. The situation where the vehicle cabin interior presence flag is set to the OFF state indicates that the smart key 2 is absent inside the vehicle cabin. The initial value of the vehicle cabin interior presence flag may be the ON state.

In S202, the vehicle cabin interior transmitter 12 transmits the simultaneous response request signal. The simultaneous response request signal is a response request signal that requests each smart key 2 to return the response signal immediately (that is, simultaneously), after each smart key 2 receives the simultaneous response request signal. In the present embodiment, for example, the simultaneous response request signal is a response request signal that requests all smart keys 2 to reply. In other words, all smart keys 2 are targets.

The simultaneous response request signal is a signal that requests the smart key 2 to return the simplified response signal. In other words, the simultaneous response request signal does not include the challenge code. The transmission of the simultaneous response request signal is completed, the process proceeds to S203. When the transmission of the simultaneous response request signal is completed, the authentication ECU 11 starts measuring the elapsed time from the time at which the transmission is completed.

In S203, it is determined whether or not the response signal from the smart key 2 has received. In a situation where the response signal from the smart key 2 has received, S204 is executed. That is, the vehicle cabin interior presence flag is set to the ON state, and then the process proceeds to S210. On the other hand, in a situation where the response signal has not received after the predetermined waiting time has elapsed from the transmission of the simultaneous response request signal, negative determination is made in S203 and then S205 is executed.

In S205, it is determined whether a quasi-signal has received in a period (in other words, during response waiting state) from the transmission of the simultaneous response request signal until the response waiting time has elapsed. The quasi-signal herein is a radio wave having a signal strength similar to that of the response signal. For example, it is determined that the quasi-signal has been received in a situation where noise (actually, the radio wave) having a signal strength larger than or equal to a predetermined threshold value has been received. The noise herein is a radio wave that does not have a signal pattern corresponding to the response signal. According to another point of view, the received signal that cannot be demodulated corresponds to the noise. The quasi-signal is a signal that assumes a radio wave observed when the response signals simultaneously transmitted by multiple smart keys 2 collide with each other or an external signal is superimposed on the response signal.

In a situation where the quasi-signal has received during waiting for response, affirmative determination is made in S205 and then S206 is executed. On the other hand, negative determination is made in S205 and then S208 is executed, in a situation where the quasi-signal has not been received. In S206, an individual confirmation process is executed. The individual confirmation process executes wireless with multiple smart keys 2 individually at a timing which does not overlap with other timings to determine whether or not the smart key 2 is present.

The vehicle cabin interior determination device F3 in the present embodiment determines whether or not the smart key is present inside the vehicle cabin by transmitting the time-difference response request signal to all the smart keys 2 from the vehicle cabin interior transmitter 12. The method for determining whether or not the smart key 2 is present inside the vehicle cabin by adopting the time-difference response request signal may apply a method similar to the above-mentioned vehicle cabin exterior determination process. That is, it is determined that at least one of the smart keys 2 is present inside the vehicle cabin, in a situation where the response signal from the at least one of the smart keys 2 has been received after the transmission of the time-difference response request signal. It is determined that the smart key 2 is absent inside the vehicle cabin, in a situation where the response signal from any of the smart keys 2 has not been received after the transmission of the time-difference response request signal.

In a situation where the presence of at least one of the smart keys 2 has been confirmed through the transmission of the time-difference response request signal as the result of the individual confirmation process (in other words, YES in S207), the vehicle cabin interior presence flag is set to the ON state, and the process proceeds to S210. In a situation where the response signal has not been received from any of the smart keys 2 after the transmission of the time-difference response request signal, the process proceeds to S208.

In S208, it is provisionally determined that the smart key 2 is not present inside the vehicle cabin, and then the process proceeds to S209. S208 corresponds to a process that maintains a state in which the vehicle cabin interior presence flag is set to the OFF state.

In S209, it is determined whether or not the number of occurrences of making provisional determination of the smart key 2 being absent inside the vehicle cabin reaches the predetermined number of occurrences for confirmation. The number of occurrences for confirmation is for example, three. The particular number of occurrences for confirmation may be designed appropriately such as two or four. The number of occurrences for confirmation may be set to two or more by assuming that the response signal has not been received due to communication error. However, the number of occurrences for confirmation may also be set to one.

In a situation where the number of provisional determination of the smart key 2 being absent inside the vehicle cabin reaches the number of occurrences for confirmation, the process proceeds to S210. On the other hand, in a situation where the number of provisional determination of the smart key 2 being absent inside the vehicle cabin has not reached the number of occurrences for confirmation, negative determination is made in S209 and then the process subsequent to S202 is executed.

In S210, it is determined whether or not the vehicle cabin interior presence flag is set to the OFF state. In a situation where the vehicle cabin interior presence flag is at the OFF state (in other words, YES in S210), the determination result of the smart key 2 being absent inside the vehicle cabin is confirmed and then the process ends (in other words, S211). On the other hand, in a situation where the vehicle cabin interior presence flag is at the ON state (in other words, NO in S210), it is determined that the smart key 2 remains inside the vehicle cabin and then the present flow ends (in other words, S212).

Figure 10:
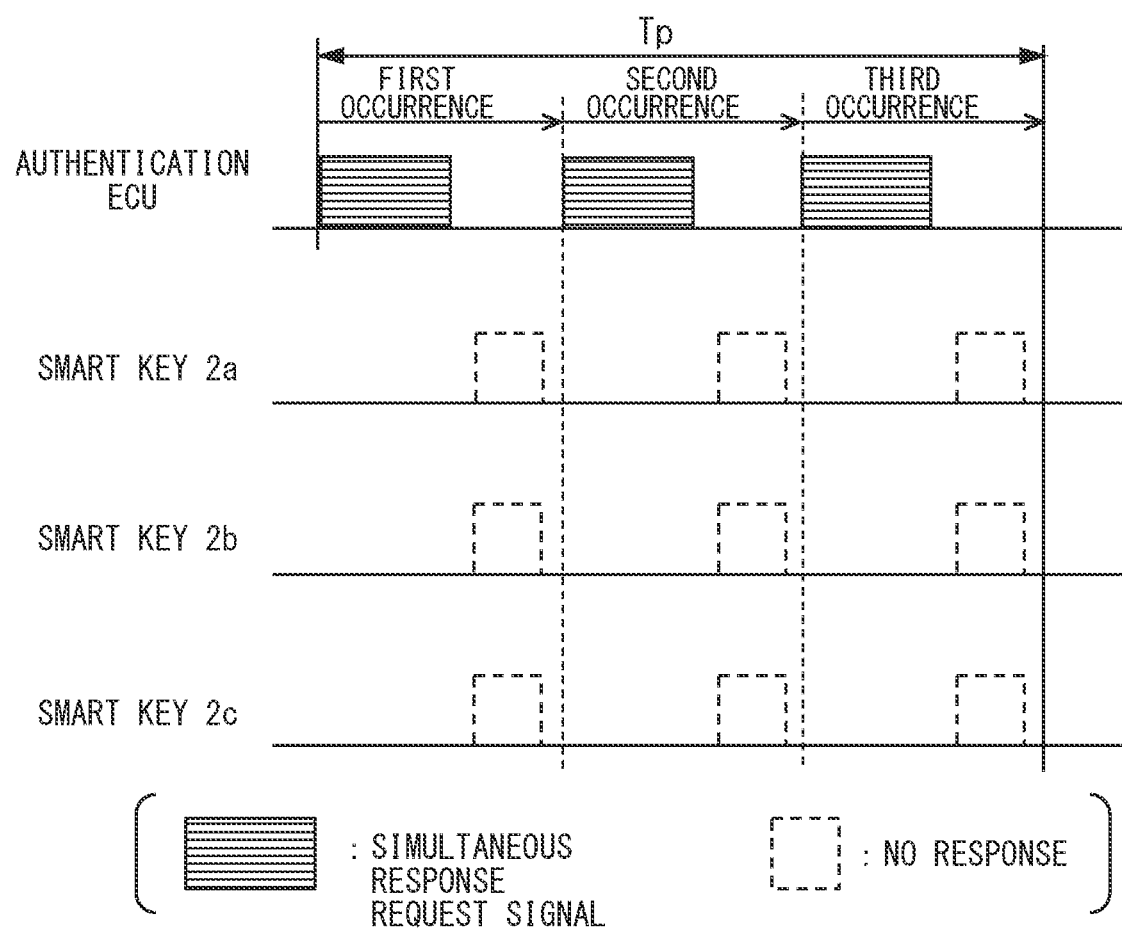
FIG. 10 is a diagram that illustrates the operation of each device at the execution of the process of confirming the smart key being absent inside the vehicle cabin, in a situation where there is no any smart key inside the vehicle cabin.

FIG. 10 conceptually illustrates the operation of the vehicle cabin interior absence confirmation process in a situation where none of the smart keys 2 is present inside the vehicle cabin. In a situation where the smart key 2 is absent, none of the smart keys 2 does not return the response signal (the simplified response signal in this example) with respect to the simultaneous response request signal transmitted in S202. Additionally, since the collision of the response signals does not occur, the quasi-signal cannot be observed. Therefore, negative determination is made in S203 and S205, and then it is provisionally determined that the smart key is absent inside the vehicle cabin in S208. The sequential process is executed three times to confirm the determination in which the smart key 2 is absent inside the vehicle cabin.

Figure 11:
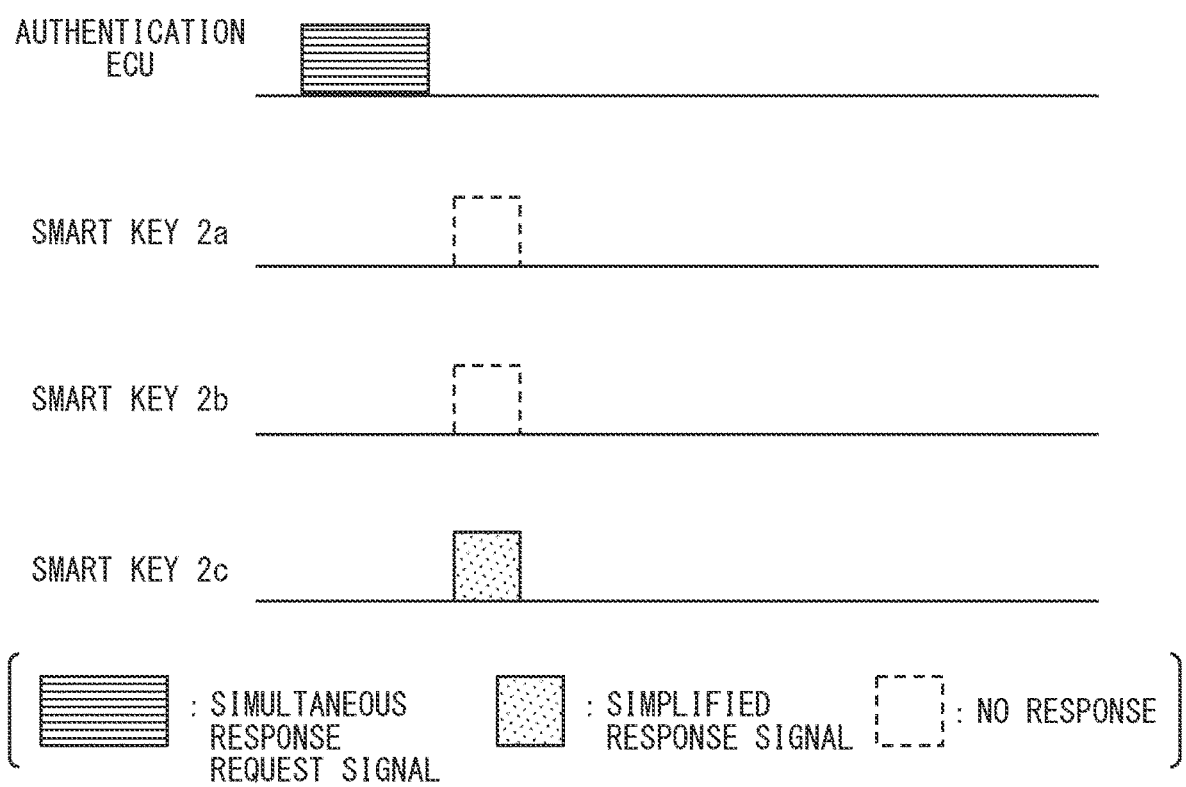
FIG. 11 is a diagram that illustrates the operation of each device at the execution of the process of confirming the smart key being absent inside the vehicle, in a situation where there is only one smart key inside the vehicle cabin.

FIG. 11 conceptually illustrates the operation of the vehicle cabin interior absence confirmation process in a situation where one of the smart keys 2 (the smart key 2c in this example) remains inside the vehicle cabin. In a situation where the smart key 2c remains inside the vehicle cabin, since the smart key 2c returns the response signal (the simplified response signal in this example) with respect to the simultaneous response request signal transmitted in S202, the authentication ECU 11 receives the response signal from the smart key 2c (in other words, YES in S203). As a result, it is determined that the smart key 2 is present inside the vehicle cabin. Since the smart keys 2 other than the smart key 2c do not return the response signal, the collision of the response signals does not occur, and the response signal from the smart key 2c is normally received by the receiver 14.

FIG. 12 conceptually illustrates the operation of the vehicle cabin interior absence confirmation process in a situation where two of the smart keys (the smart keys 2b, 2c in this example) remain inside the vehicle cabin. In a situation where the smart keys 2b, 2c remain inside the vehicle cabin, the smart keys 2b, 2c return the response signal (the simplified response signal in this example) with respect to the simultaneous response request signal transmitted in S202. Since the time difference is not set at the timing during which the smart keys 2a, 2c respectively return the response signals, these response signals may encounter collision (in other words, interference) and the demodulation at the receiver 14 may fail.

However, the signal in which the overlapping response signals of the respective smart keys 2b, 2c has a signal strength similar to the response signal. Therefore, the respective response signals of the smart keys 2b, 2c are observed as the quasi-signals (in other words, YES in S205), and the individual confirmation process is executed (in other words, S206). The individual confirmation process executes wireless with multiple smart keys 2 individually at a timing which does not overlap with other timings to determine whether or not the smart key 2 is present without receiving communication interference. As a result, in the example illustrated in FIG. 12, it is detected that the smart keys 2b, 2c are present inside the vehicle cabin. In other words, even when multiple smart keys 2 are present inside the vehicle cabin, it is possible to determine whether or not the smart key 2 remains inside the vehicle cabin and reduce the possibility of confining the smart key 2 inside the vehicle cabin.

(Effects of the Embodiment)

This section describes the effects of the above-mentioned embodiment by introducing a comparative configuration.

Figure 13:
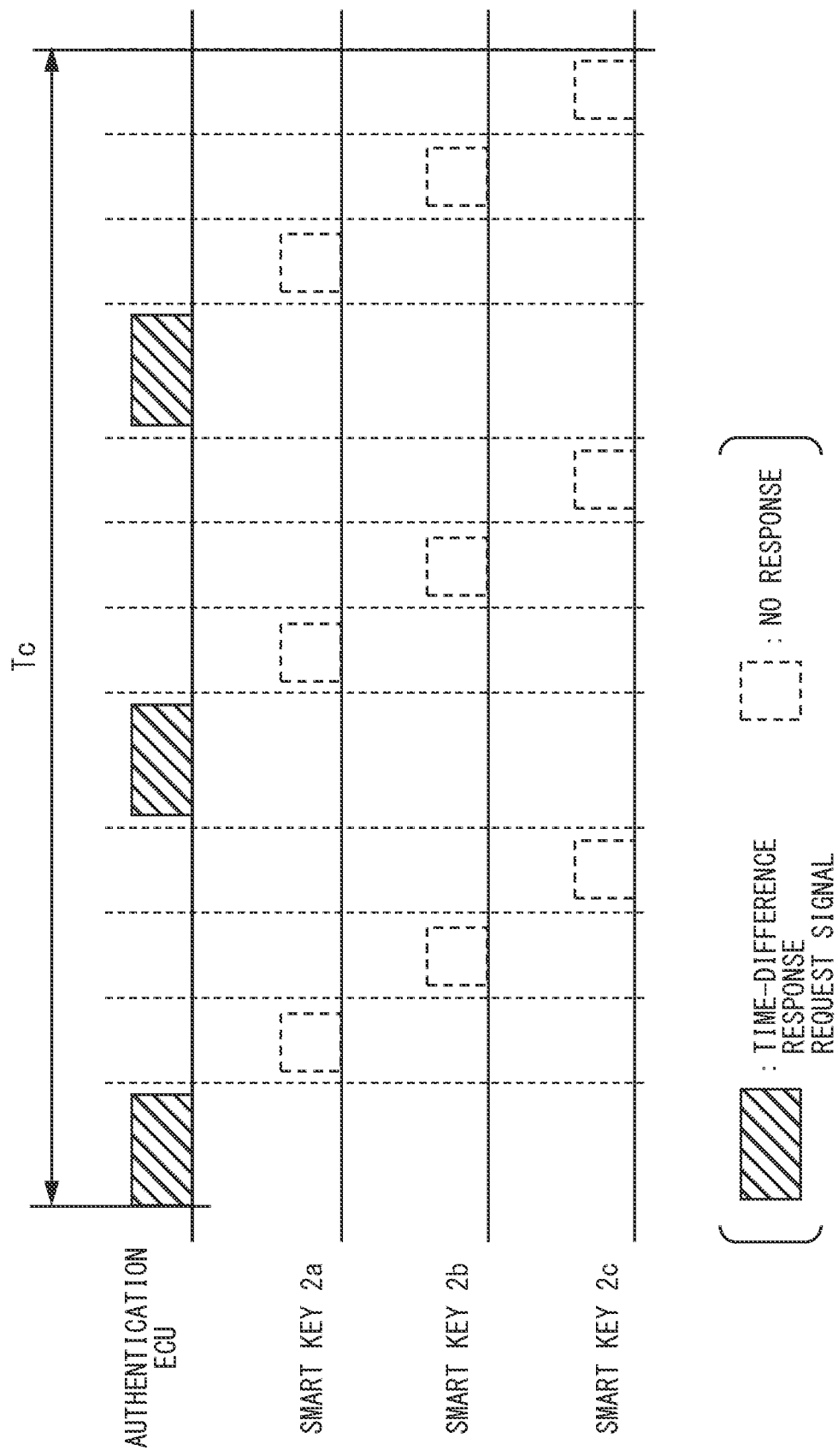
FIG. 13 is a diagram that illustrates a comparative configuration.

As illustrated in FIG. 13, the comparative configuration confirms that the smart key 2 is not present inside the vehicle cabin by replying the time-difference response request signal multiple occurrences. In such a comparative configuration, the total waiting time for one transmission of the time-difference response request signal takes longer as the number of smart keys 2 increases. Therefore, it is necessary to wait for the reply from each smart key 2 with time difference. For example, in a situation where six smart keys 2 are issued for the vehicle Hv, it is necessary to wait for six time periods. Thus, with regard to the comparative configuration, the time Tc required to confirm the determination in which the smart key is absent inside the vehicle cabin takes longer with respect to the number of smart keys 2 included in the vehicle Hv.

On the other hand, the configuration according to the present embodiment requests each smart key 2 to reply simultaneously. In other words, the authentication ECU 11 according to the present embodiment receives the reply from each of multiple smart keys 2 without time difference. Subsequently, it is determined that the smart key 2 is absent inside the vehicle cabin based on the situation that the response signal from the smart key 2 is not received.

According to the configuration, in a situation where the smart key 2 is absent inside the vehicle cabin, the time Tp (hereinafter referred to as absence determination required time) required to confirm the determination in which the smart key 2 is absent inside the vehicle cabin is independent from the number of smart keys 2. In other words, the response waiting time along with one transmission of the simultaneous response request signal is constant regardless of the number of smart keys 2. Therefore, even if the number of smart keys 2 of the vehicle Hv increases, the absence determination required time in a situation where the smart key 2 is absent inside the vehicle cabin does not change. Therefore, it is possible to inhibit an increase in the absence determination required time Tp as the number of smart keys 2 of the vehicle Hv increases.

According to the above configuration, it is possible to minimize the time required for provisionally determining that the smart key 2 is absent inside the vehicle cabin, since the reply from each smart key 2 is awaited without time difference. Along with this situation, it is possible to minimize the absence determination required time Tp in a situation where the smart key 2 is absent inside the vehicle cabin. As a result, it is possible to enhance the responsiveness to the user's locking operation in a situation where the smart key 2 is absent inside the vehicle cabin. The effect of decreasing the absence determination required time Tp in the present embodiment as compared with the comparative configuration is remarkable as the number of issued smart keys 2 is larger.

In the above configuration, with regard to the determination in which whether or not the smart key 2 is present within the locking area Lx, the detection of the smart key 2 is attempted by adopting the time-difference response request signal instead of the simultaneous response request signal. Additionally, in the vehicle cabin exterior confirmation process, the authentication process of the smart key 2 which has returned the response signal is executed. Therefore, it is possible to enhance the certainty of the determination result in which the smart key 2 is present at the locking area Lx. According to the configuration in which the response request signal including the challenge code is transmitted as the time-difference response request signal, it is possible to further shorten the time required for determination in which the smart key 2 is present at the locking area Lx.

As described above, the authentication ECU 11 according to the present embodiment detects that the smart key 2 is present outside the vehicle cabin by executing wireless communication with each of multiple smart keys at timing which does not overlap with other timings. The situation where the smart key 2 is absent inside the vehicle cabin is confirmed based on the condition where a radio wave belonging to the response signal has not been received. Such a configuration corresponds to a configuration separately providing a detector for detecting that the smart key 2 is present at the locking area Lx and a detector for detecting that the smart key 2 is absent inside the vehicle cabin.

While the embodiments of the present disclosure have been described above, the present disclosure is not limited to the embodiments described above, and various modifications to be described below are included in the technical scope of the present disclosure, and may be implemented by various modifications within a scope not departing from the spirit described below. For example, various modifications to be described below can be implemented in combination as appropriate within a scope that does not cause technical inconsistency. Note that members having the same functions as those described in the above embodiment are denoted by the same reference numerals, and a description of the same members will be omitted. When only a part of the configuration is referred to, the configuration of the embodiment described above can be applied to other parts.

(First Modification)

In the above-mentioned embodiment, it is described that the vehicle cabin interior determination device F3 as S202 transmits the LF signal for requesting all smart keys 2 to return the response signal simultaneously, as the simultaneous response request signal. However, it is not limited to this situation. The simultaneous response request signal transmitted in S202 may be the LF signal for requesting only a part of the smart keys 2 to return the response signal. The following describes specific examples.

According to the procedure of the door locking process in the above-mentioned embodiment, the vehicle cabin interior absence confirmation process is executed in a condition that the vehicle cabin exterior presence confirmation process is executed to confirm the presence of at least one smart key 2 at the locking area Lx. In other words, at this stage of executing the vehicle cabin exterior absence confirmation process, it has been identified that at least one of multiple smart keys 2 is present at the locking area Lx. With regard to the smart key 2 which is identified to be present outside the vehicle cabin, it is not required to request the response signal to be returned in the vehicle cabin absence confirmation process.

Figure 14:
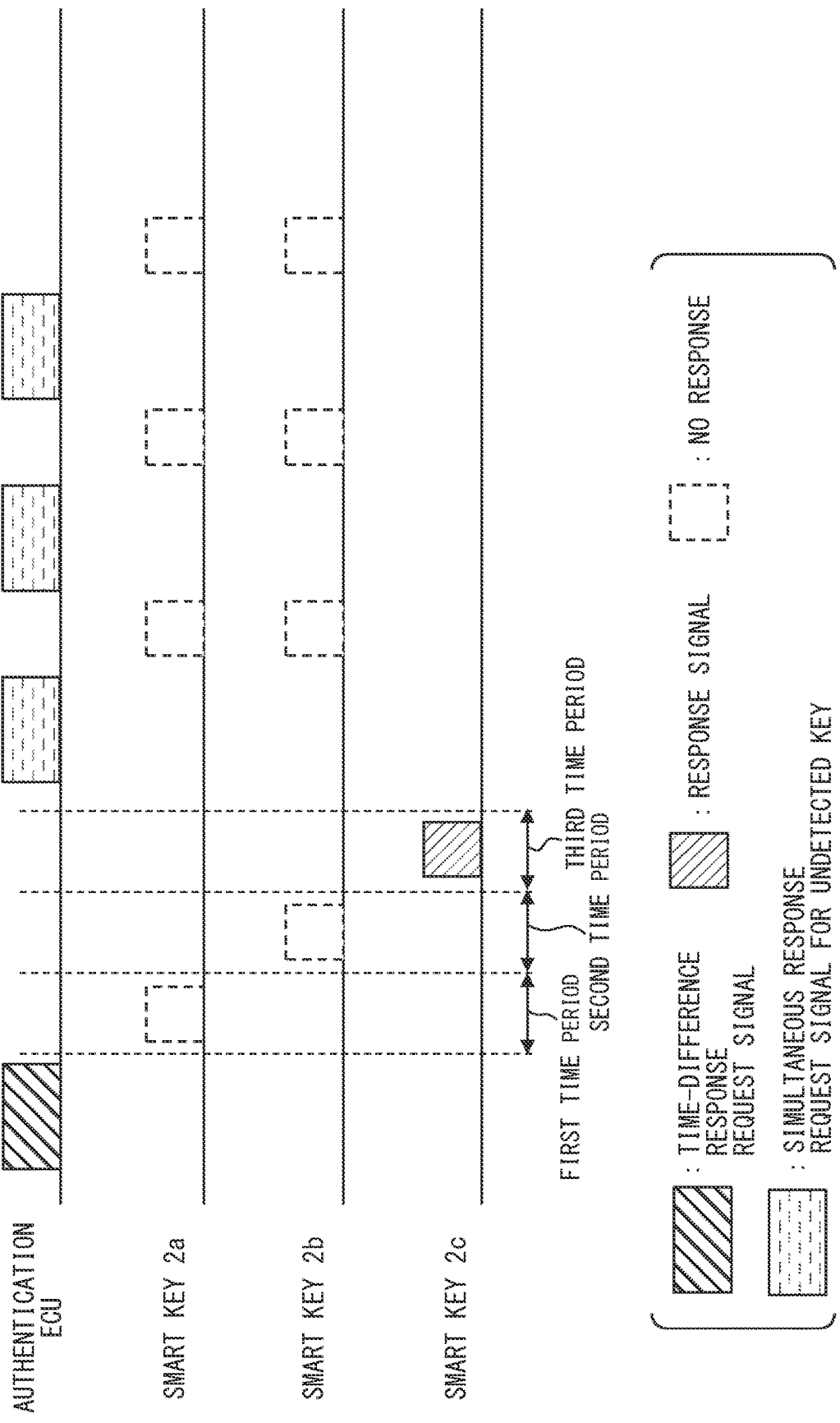
FIG. 14 is a diagram that illustrates the operation of the authentication ECU in a first modification example.

In view of such circumstances, the simultaneous response request signal transmitted in S202 of the vehicle cabin interior absence conformation process may also be the LF signal for requesting only the smart key 2 whose location has not been confirmed by the vehicle cabin exterior presence confirmation process to return the response signal. For example, as illustrated in FIG. 14, in a situation where the vehicle cabin exterior presence confirmation process determines that the smart key 2c is present at the locking area Lx, the vehicle cabin interior determination device F3 transmits the simultaneous response request signal to the smart keys 2a, 2b as in S202. The response request signal for the target smart key 2 is the LF signal that requests the smart key 2 to return the response signal.

For simplicity, the smart key 2 which has been confirmed to be present at the locking area Lx by the vehicle cabin exterior presence confirmation process may also be described as a detected key. The smart key 2 other than the detected key may also be described as undetected key. The undetected key corresponds to the smart key 2 whose location is unknown at the time where the vehicle cabin exterior presence confirmation process is completed. In the example illustrated in FIG. 14, the smart keys 2a, 2b correspond to undetected keys at the time where the vehicle cabin exterior presence confirmation process is completed. The simultaneous response request signal for requesting the undetected keys to return the response signal simultaneously may also be described as a simultaneous response request signal for undetected keys. The simultaneous response request signal for undetected keys corresponds to a simultaneous response request signal that prohibits the detected key to return the response signal.

FIG. 14 conceptually illustrates an example of the operation of each device at the time of the vehicle cabin absence determination process in a situation where the smart keys 2a, 2b are absent inside the vehicle cabin. As another example, in a situation where the smart key 2a remains inside the vehicle cabin, the authentication ECU 11 receives the response signal, which is transmitted from the smart key 2a, with respect to the simultaneous response signal for undetected keys. In a situation where the smart keys 2a, 2b remain inside the vehicle cabin, the authentication ECU 11 executes the individual confirmation process since the authentication ECU 11 receives the quasi-signal.

In the individual confirmation process at S206, since the detected key is confirmed to be present outside the vehicle cabin, it is not necessary for the detected key to return the response signal and not necessary for waiting the return of the response signal. In other words, the individual confirmation process at S206 may be executed only on the undetected key. As illustrated in FIG. 14, in a situation where the smart key 2c is the detected key, the individual confirmation process may be executed on the smart keys 2a, 2b when the quasi-signal is received. The individual confirmation process for the smart keys 2a, 2b may be executed, for example, by transmitting the time-difference response request signal for requesting only the smart keys 2a, 2b as the undetected keys to return the response signal. The time-difference response request signal for undetected keys corresponds to a time-difference response request signal that prohibits the detected key to return the response signal.

According to the above configuration, it is possible to reduce the possibility of having the collision of the response signals of the respective smart keys 2, since the number of smart keys 2 requested to return the response signals simultaneously by the simultaneous response request signal is limited. In a situation where the response area of the vehicle cabin interior transmitter 12 leaks to the outside of the vehicle cabin, it is possible to reduce the possibility of the smart key 2 being present outside the vehicle cabin returning the response signal with respect to the simultaneous response request signal transmitted from the vehicle cabin interior transmitter 12. In other words, in a situation where the response area of the vehicle cabin interior transmitter 12 leaks to the outside of the vehicle cabin, it is possible to reduce the possibility of having an error determination of the smart key 2 remaining inside the vehicle cabin when the smart key 2 is present outside the vehicle cabin.

The vehicle cabin interior determination device F3 may determine that the smart key 2 is absent inside the vehicle cabin, in a situation where the vehicle cabin exterior presence confirmation process has confirmed that all smart keys 2 are present at the locking area Lx. In a situation where the vehicle cabin exterior presence confirmation process has confirmed that all the smart keys 2 are present at the locking area Lx, the number of confirmations may be modified to a smaller number (for example, one) than usual.

(Second Modification)

Figure 15:
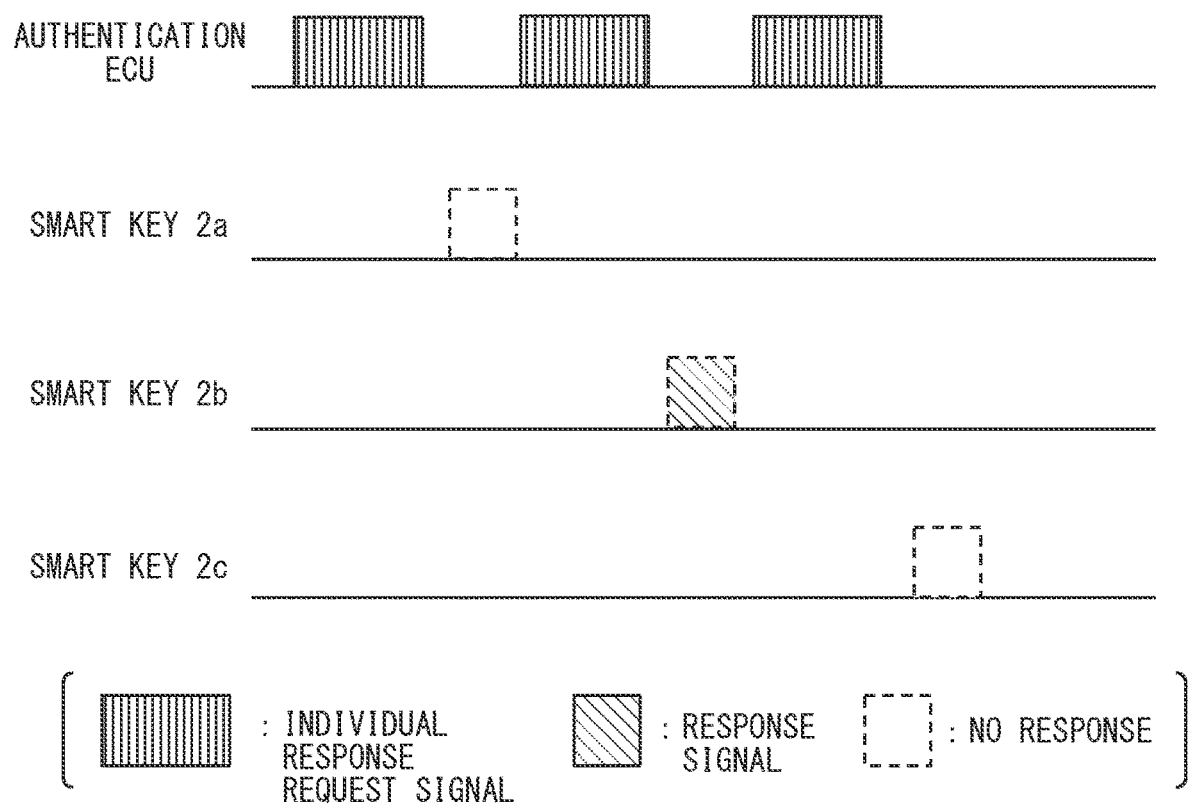
FIG. 15 is a diagram that illustrates the operation of the authentication ECU in a second modification example.

In the above-mentioned embodiment or the first modification, it is described that the individual confirmation process (in other words, S202) executes the determination whether or not each smart key 2 (in other words, individual smart key 2) is present inside the vehicle cabin by transmitting the time-difference response request signal for all or a part of the smart keys 2. However, the method for determining each individual smart key 2 is not limited to this method. For example, the vehicle cabin interior determination device F3 may determine whether or not each smart key 2 is present inside the vehicle cabin by sequentially transmitting an individual response request signal for requesting only one specified smart key 2 to return the response signal, as illustrated in FIG. 15. FIG. 15 illustrates the operation of each device in a situation where the smart key 2b is present inside the vehicle cabin.

The vehicle cabin exterior presence determination device F4 also may determine whether or not each smart key 2 is present at the locking area by sequentially transmitting the individual response request signal for each smart key 2. Such a configuration corresponds to a configuration fore requesting each of multiple smart keys 2 to return the response signal such that the return timings of the respective response signals of multiple smart keys 2 do not overlap from each other.

(Third Modification)

In the above-mentioned embodiment, it is described that the vehicle cabin interior absence confirmation process is executed after the execution of the vehicle cabin exterior presence confirmation process triggered by the pressing of the locking button 15. However, it is not limited to this situation. For example, as illustrated in FIG. 16, the door locking process may execute the vehicle cabin interior absence confirmation process triggered by closing all doors of the vehicle Hv, and subsequently execute the vehicle cabin exterior confirmation process in a situation where the locking button 15 is pressed down.

Figure 16:
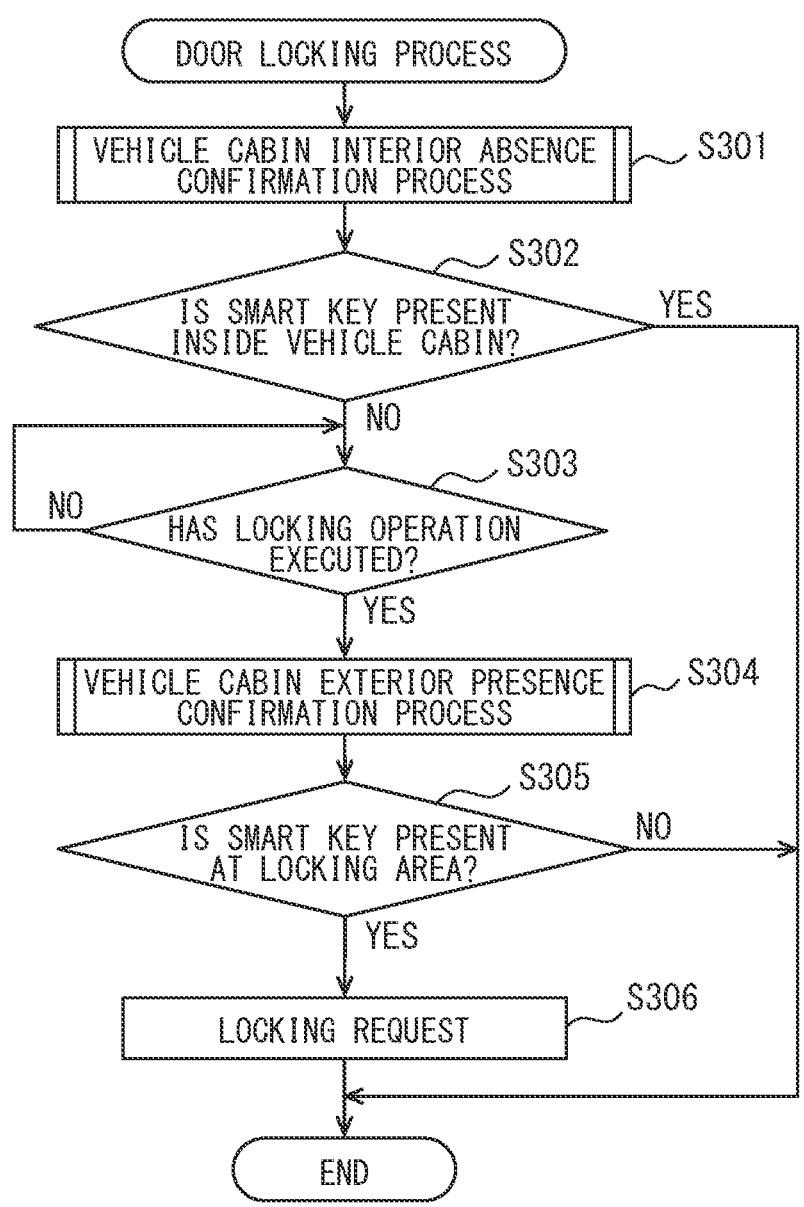
FIG. 16 is a flowchart related to the door locking process executed by the authentication ECU in a third modification example.

The following describes the door locking process disclosed in the third embodiment with reference to the flowchart in FIG. 16. The flowchart in FIG. 16 may start in a situation where the vehicle information acquisition device F1 detects that all doors of the vehicle Hv are closed. The door locking process according to the present modification includes S301 to S306.

In S301, the vehicle cabin interior determination device F3 executes the vehicle cabin interior absence confirmation process, and then the process proceeds to S302. S302 determines whether or not the smart key 2 is present inside the vehicle cabin. In S302, negative determination is made and then S303 is executed, in a situation where it is determined that the smart key 2 is absent inside the vehicle cabin as the result of the vehicle cabin absence confirmation process at S301. On the other hand, affirmative decision is made in S302 and then the present flow ends, in a situation where it is determined that the smart key 2 is present inside the vehicle cabin as the result of the vehicle cabin interior absence confirmation process at S301.

In S303, the vehicle information acquisition device F1 determines whether or not the user presses down the locking button. In a situation where the user presses down the locking button, affirmative determination is made in S303 and then the vehicle cabin exterior presence confirmation process as S304 is executed.

In S304, the vehicle cabin exterior determination device F4 executes the vehicle cabin exterior presence confirmation process, and then the process proceeds to S305. S305 determines whether or not the smart key 2 is present at the locking area Lx. In S305, affirmative determination is made in S305 and then S306 is executed, in a situation where it is detected the smart key 2 is present at the locking area Lx as the result of the vehicle cabin exterior presence confirmation process at S304. On the other hand, negative determination is made in S305 and then the present flow ends, in a situation where it is detected that the smart key 2 is absent at the locking area Lx as the result of the vehicle cabin exterior presence confirmation process at S304.

In S306, the control execution device F5 locks the door of the vehicle Hv in collaboration with the body ECU 16 and then the present flow ends. According to the above configuration, it is possible to further enhance the responsiveness to the user's locking instruction.

(Additional Notes: The Configuration of Authentication ECU 11)

Some or all of the functions of the authentication ECU 11 may be configured as hardware. A configuration in which a certain function is realized as hardware includes a configuration in which the function is realized by use of one or more ICs or the like. The units or functions provided by the authentication ECU 11 may be provided by software stored in a tangible memory device and a computer executing the software, only software, only hardware, or a combination of the software and the hardware. For example, when the authentication ECU 11 is provided by an electronic circuit being hardware, it may be possible to provide by a digital circuit including multiple logic circuits or analog circuits.

The authentication ECU 11 may also be provided by a set of computer resources linked by a data communication device. For example, a part of the functions provided by the authentication ECU 11 in the present embodiment may be included in another ECU (for example, the body ECU). In a situation where the functions provided by the authentication ECU 11 are distributed in multiple ECUs, the configuration having these multiple ECUs corresponds to the vehicle authentication apparatus.

The process of the flowchart or the flowchart described in this application includes a plurality of sections (or steps), and each section is expressed as, for example, S1. Each section may be divided into several subsections, while several sections may be combined into one section. Furthermore, each section thus configured may be referred to as a device, module, or means.

What is claimed is:

1. A vehicle authentication apparatus including a plurality of mobile devices respectively functioning as keys of a vehicle, the vehicle authentication apparatus comprising:

a first communication device configured to specify a first area, which is preliminarily set for the vehicle, as a communication area;

a second communication device configured to specify a second area, which is preliminarily set for the vehicle and does not overlap with the first area, as the communication area;

a first area determination device configured to determine whether or not the mobile devices are present at the first area based on a communication status of the first communication device with the mobile devices;

a second area determination device configured to determine whether or not the mobile devices are present at the second area based on a communication status of the second communication device with the mobile devices;
a control execution device configured to execute a predetermined vehicle control in response to that:
the first area determination device determines that none of the mobile devices are present at the first area; and
the second area determination device determines that at least one of the mobile devices is present at the second area,
wherein the first area determination device is further configured to:
transmit a simultaneous response request signal for requesting the mobile devices to respectively return response signals simultaneously in collaboration with the first communication device; and
determine that the mobile devices are absent at the first area, in response to that the first area determination device does not receive the response signals, which are respectively from the mobile devices, corresponding to the simultaneous response request signal, and
wherein the second area determination device is further configured to:
request the mobile devices to respectively return the response signals at different return timings which do not overlap with each other, in collaboration with the second communication device; and
determine that the at least one of the mobile devices is present at the second area in response to that the second area determination device receives at least one of the response signals respectively from the mobile devices.

2. The vehicle authentication apparatus according to claim 1, further comprising:
a vehicle cabin interior communication device configured as the first communication device to specify vehicle cabin interior of the vehicle as the communication area, the vehicle cabin interior being the first area;
a vehicle cabin exterior communication device configured as the second communication device to specify a locking area, which is preliminarily set at vehicle cabin exterior of the vehicle, as the communication area, the vehicle cabin exterior being the second area;
a vehicle cabin interior determination device as the first area determination device configured to determine whether or not the mobile devices are present at the vehicle cabin interior, based on a reception condition of the response signals in response to that the vehicle cabin interior communication device transmits the simultaneous response request signal;
a vehicle cabin exterior determination device as the second area determination device configured to determine whether or not the mobile devices are present at the locking area, based on a communication status of the vehicle cabin exterior communication device with the mobile devices,
wherein the control execution device is further configured to lock doors of the vehicle in response to that:
the vehicle cabin interior determination device determines that none of the mobile devices are present at the vehicle cabin interior; and
the vehicle cabin exterior determination device determines that the at least one of the mobile devices is present at the locking area.

3. The vehicle authentication apparatus according to claim 2,
wherein the vehicle cabin interior determination device is further configured to transmit a time-difference response request signal for requesting the mobile devices to respectively return the response signals at different timings which do not overlap with each other, in response to receiving a quasi-signal as noise having a predetermined signal strength during waiting for reception of the response signals corresponding to the simultaneous response request signal.

4. The vehicle authentication apparatus according to claim 3,
wherein the vehicle cabin interior determination device is further configured to:
transmit the simultaneous response request signal multiple times; and
confirm determination of none of the mobile devices being present at the vehicle cabin interior, in response to that the vehicle cabin interior determination device does not receive the response signals and the quasi-signal corresponding to the simultaneous response request signal.

5. The vehicle authentication apparatus according to claim 2,
wherein the vehicle cabin exterior determination device is further configured to:
transmit a time-difference response signal for requesting the mobile devices to respectively return the response signals at different timings which do not overlap with each other; and
determine that the at least one of the mobile devices is present at the locking area in response to receiving the at least one of the response signals respectively from the mobile devices.

6. The vehicle authentication apparatus according to claim 2,
wherein, in a situation where the vehicle cabin exterior determination device determines that the at least one of the mobile devices is present at the locking area by executing wireless communication with the at least one of the mobile devices through the vehicle cabin exterior determination device, the vehicle cabin exterior determination device is further configured to identify the at least one of the mobile devices being present at the locking area, based on contents of the response signal from the at least one of the mobile devices, and
wherein the vehicle cabin interior determination device is further configured to:
determine whether or not one or more of the mobile devices are present at the vehicle cabin interior in collaboration with the vehicle cabin interior communication device after the vehicle cabin exterior determination device determines that the at least one of the mobile devices is present at the locking area; and
transmit a signal for requesting one or more of the mobile devices which are other than the at least one of the mobile devices determined to be present at the locking area by the vehicle cabin exterior determination device, to return the response signal simultaneously.

7. The vehicle authentication apparatus according to claim 2, further comprising:
a door closing detector configured to detect a situation where all of the doors of the vehicle are closed; and
a locking instruction determination device configured to determine whether or not a user gives an instruction of locking the doors, based on an output signal of an input device configured to receive the instruction of locking the doors from the user, wherein the vehicle cabin interior determination device is further configured to determine whether or not the mobile devices are present at the vehicle cabin interior in collaboration with the vehicle cabin interior communication device, in response to that the door closing detector detects that all of the doors are closed, and wherein the vehicle cabin exterior determination device is further configured to determine whether or not the mobile devices are present at the locking area by executing wireless communication with the mobile devices through the vehicle cabin exterior communication device, in response to that the locking instruction determination device determines that the user has given the instruction of locking the doors.

8. A vehicle authentication apparatus comprising:
a plurality of mobile devices configured as keys of a vehicle;
a first low-frequency transmitter configured to specify a first area, which is preliminarily set for the vehicle, as a communication area;
a second low-frequency transmitter configured to specify a second area, which is preliminarily set for the vehicle and does not overlap with the first area, as the communication area;
an authentication ECU configured as a computer having a processor to:
determine whether or not the mobile devices are present at the first area based on a communication status of the first low-frequency transmitter with the mobile devices;
determine whether or not the mobile devices are present at the second area based on a communication status of the second low-frequency transmitter with the mobile devices;
execute a predetermined vehicle control in response to determining none of the mobile devices being present at the first area and determining at least one of the mobile devices being present at the second area;
transmit a simultaneous response request signal for requesting the mobile devices to respectively return response signals simultaneously in collaboration with the first low-frequency transmitter;
determine that the mobile devices are absent at the first area, in response to that the authentication ECU does not receive the response signals, which are respectively from the mobile devices, corresponding to the simultaneous response request signal;
request the mobile devices to respectively return the response signals at different return timings which do not overlap with each other, in collaboration with the second low-frequency transmitter; and
determine that the at least one of the mobile devices is present at the second area in response to receiving at least one of the response signals respectively from the mobile devices.

* * * * *